United States Patent
Gatalo et al.

(10) Patent No.: US 12,251,756 B2
(45) Date of Patent: Mar. 18, 2025

(54) METHOD FOR PREPARATION OF A SUPPORTED NOBLE METAL-METAL ALLOY COMPOSITE, AND THE OBTAINED SUPPORTED NOBLE METAL-METAL ALLOY COMPOSITE

(71) Applicant: KEMIJSKI INŠTITUT, Ljubljana (SI)

(72) Inventors: Matija Gatalo, Ljubljana (SI); Nejc Hodnik, Ljubljana (SI); Marjan Bele, Ljubljana (SI); Miran Gaberšcek, Domžale (SI)

(73) Assignee: KEMIJSKI INSTITUT, Ljubljana (SI)

( * ) Notice: Subject to any disclaimer, the term of this patent is extended or adjusted under 35 U.S.C. 154(b) by 653 days.

(21) Appl. No.: 17/438,511

(22) PCT Filed: Mar. 17, 2020

(86) PCT No.: PCT/EP2020/057334
§ 371 (c)(1),
(2) Date: Sep. 13, 2021

(87) PCT Pub. No.: WO2020/187933
PCT Pub. Date: Sep. 24, 2020

(65) Prior Publication Data
US 2022/0143691 A1   May 12, 2022

(30) Foreign Application Priority Data
Mar. 18, 2019  (LU) ........................................ 101157

(51) Int. Cl.
*B22F 9/24* (2006.01)
*B22F 1/054* (2022.01)
(Continued)

(52) U.S. Cl.
CPC ............... *B22F 1/054* (2022.01); *B22F 1/18* (2022.01); *B22F 9/24* (2013.01); *B82Y 40/00* (2013.01);
(Continued)

(58) Field of Classification Search
None
See application file for complete search history.

(56) References Cited

U.S. PATENT DOCUMENTS

2006/0134505 A1* 6/2006 Wang ..................... B22F 1/17
429/525
2010/0197490 A1* 8/2010 Adzic .................... B82Y 30/00
977/773
(Continued)

FOREIGN PATENT DOCUMENTS

JP    2017029967 A    2/2017
WO   2012/009467 A1   1/2012

OTHER PUBLICATIONS

International Search Report and Written Opinion issued by WIPO for corresponding International Patent Application No. PCT/EP2020/057334 mailed on May 19, 2020.
(Continued)

*Primary Examiner* — George Wyszomierski
(74) *Attorney, Agent, or Firm* — Renner, Otto, Boisselle & Sklar, LLP

(57) ABSTRACT

The present invention concerns a double passivation galvanic displacement (GD) synthesis method for production of high performance, supported noble metal-M alloy composite material, where M is an electrochemically less noble metal, compared to the noble metal, the supported noble metal-M alloy composite material obtained by the synthesis, and the use of such composite material as electrocatalyst material.

11 Claims, 14 Drawing Sheets

(51) Int. Cl.
  *B22F 1/18* (2022.01)
  *B82Y 40/00* (2011.01)
  *B82Y 30/00* (2011.01)

(52) U.S. Cl.
  CPC ....... *B22F 2301/10* (2013.01); *B22F 2301/25* (2013.01); *B22F 2302/40* (2013.01); *B22F 2304/054* (2013.01); *B82Y 30/00* (2013.01)

(56) References Cited

U.S. PATENT DOCUMENTS

| | | | |
|---|---|---|---|
| 2012/0208108 A1 | 8/2012 | Zhang et al. | |
| 2012/0264598 A1* | 10/2012 | Carpenter | H01M 4/921 502/326 |
| 2013/0034803 A1* | 2/2013 | Adzic | H01G 11/46 977/773 |
| 2013/0177838 A1* | 7/2013 | Wang | B01J 23/468 429/525 |
| 2016/0126562 A1 | 5/2016 | Pivovar et al. | |
| 2016/0181622 A1 | 6/2016 | Dutta et al. | |
| 2018/0047993 A1 | 2/2018 | Inaba | |

OTHER PUBLICATIONS

Surbhi Sharma et al.; "Support materials for PEMFC and DMFC electrocatalysts—A review;" Journal of Power Sources; vol. 208, pp. 96-119; Jun. 1, 2012.
T.J. Schmidt et al.; "Characterization of High-Surface-Area Electrocatalysts Using a Rotating Disc Electrode Configuration;" The Electrochemical Society Inc.; vol. 45, No. 7; Jul. 1998.
K.J.J. Mayrhofer et al.; "Measurement of oxygen reduction activities via the rotating disc electrode method: From Pt model surfaces from carbon-supported high surface area catalysts;" Elechtrochimica Acta; http://www.elsevier.com/locate/electacta; Dec. 4, 2007.
Notification of the First Office Action issued Aug. 18, 2023, for Chinese Patent Application No. 202080019965.9.
Office Action issued for corresponding Japanese National Stage Application No. 2022-504330, issued Mar. 11, 2024.
Examination Report issued by the European Patent Office for corresponding European National Stage Application No. 20 710 548.7, mailed Feb. 3, 2023.
Huang, L. F. et al., "Improved Electrochemical Phase Diagrams from Theory and Experiment: The Ni-Water System and its Complex Compounds," published in The Journal of Physical Chemistry, copyright of American Chemical Society, 2017.

* cited by examiner

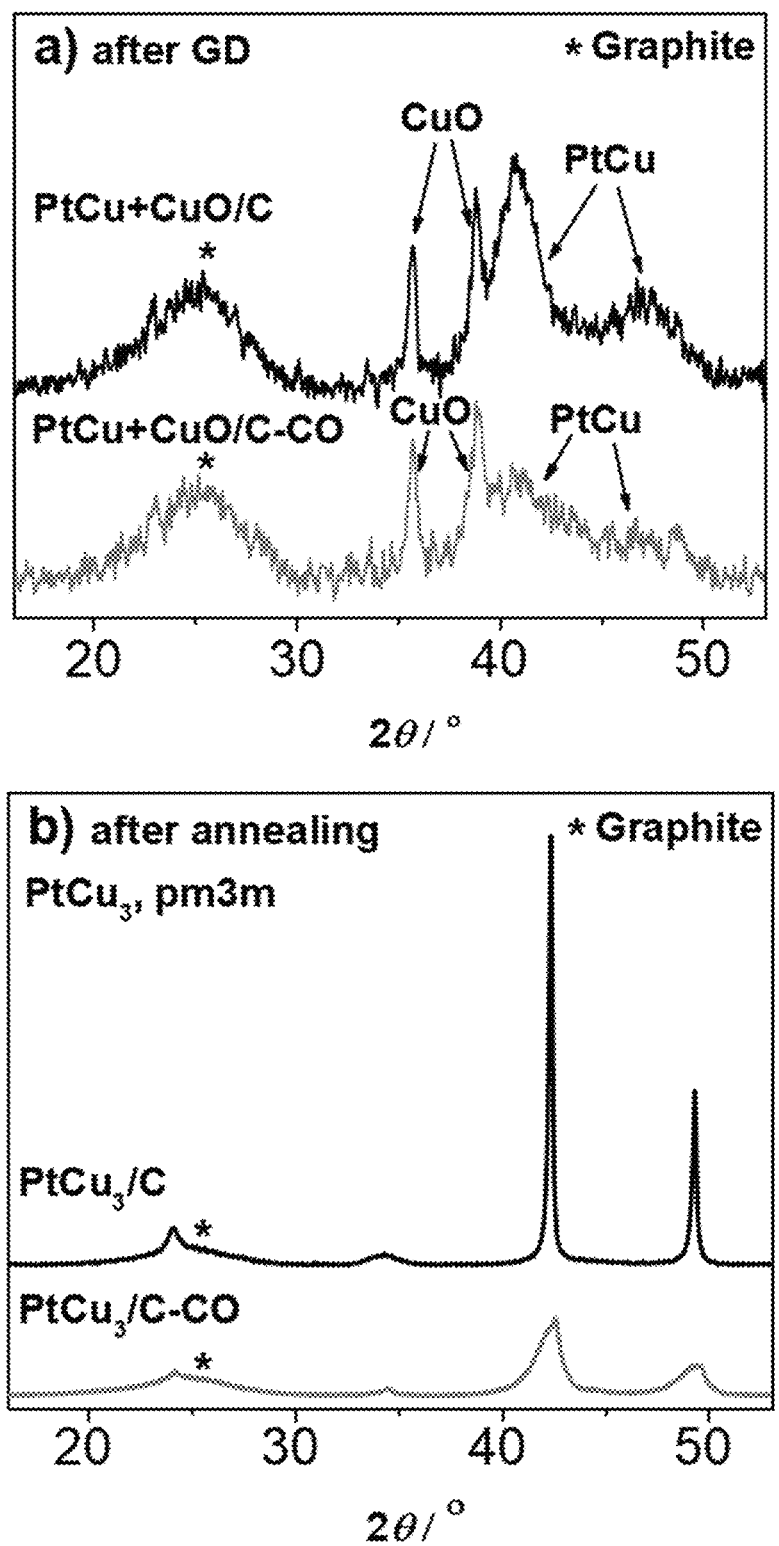
FIG. 10 a)-b)

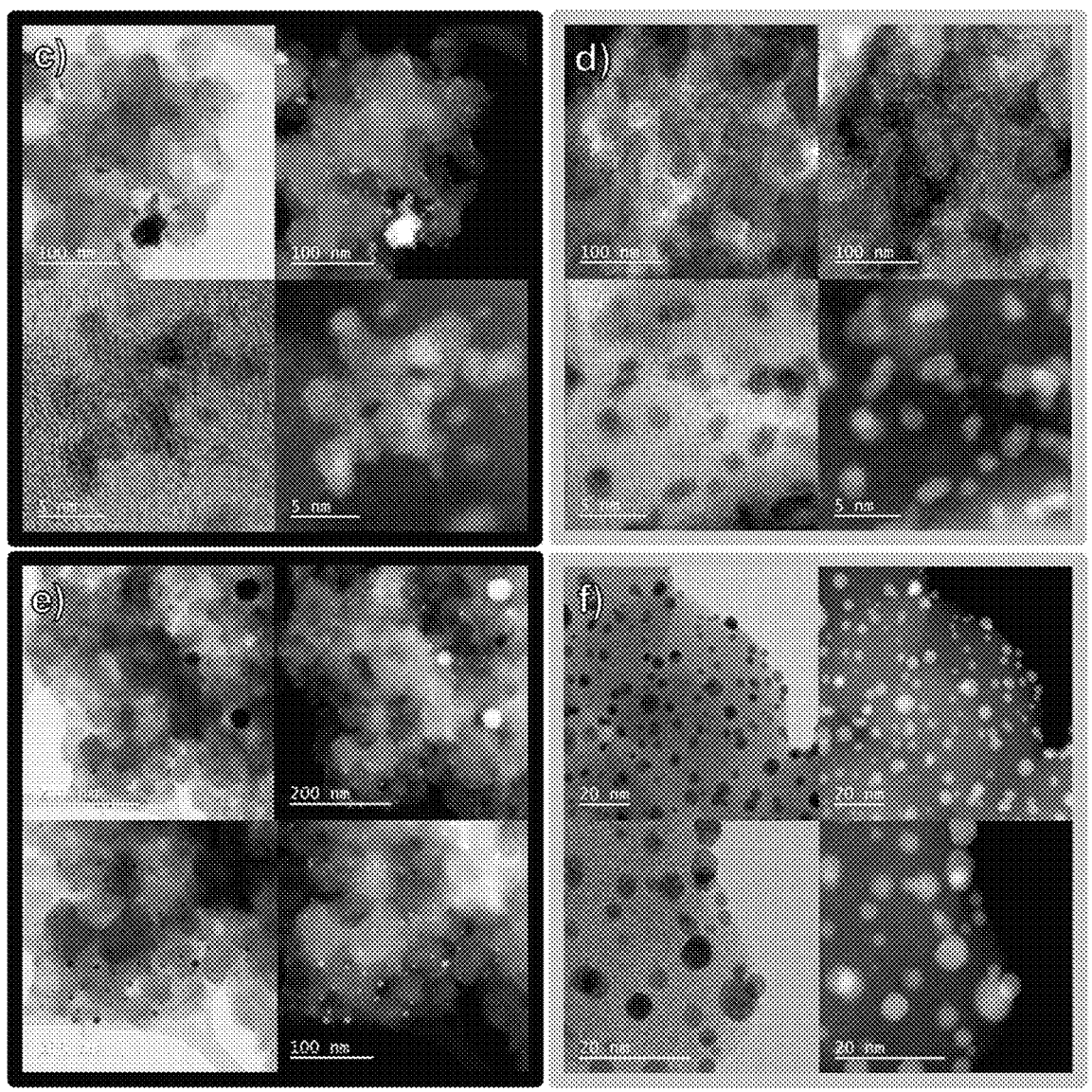
FIG. 10 c)-h)

METHOD FOR PREPARATION OF A SUPPORTED NOBLE METAL-METAL ALLOY COMPOSITE, AND THE OBTAINED SUPPORTED NOBLE METAL-METAL ALLOY COMPOSITE

This application is a national phase of International Application No. PCT/EP2020/057334 filed 17 Mar. 2020, which claims priority to Luxembourg Application No. LU101157 filed 18 Mar. 2019, the entireties of which are hereby incorporated by reference.

TECHNICAL FIELD

The present application relates to a method for preparation of supported noble metal-metal alloy composite materials by a galvanic displacement synthesis process, and the supported noble metal-metal alloy composite materials obtained by the process. The present application especially relates a synthesis method for production of high performance supported noble metal-M alloy electrocatalysts composite material, the supported noble metal-M alloy electrocatalysts composite material obtained by the method and the use thereof.

BACKGROUND ART

Proton Exchange Membrane fuel cells (PEMFC), which are able to efficiently convert hydrogen to electrical energy with the only side product being water (and heat), will play an important part in the future sustainable energy solutions. Prior to wide adoption by large industries, including the automotive sector, PEMFC technology needs first to address many inherent issues related to the electrocatalyst such as the high overpotential of the cathode oxygen reduction reaction (ORR) that demands high Pt loadings which, in turn, leads to high costs. This issue can be tackled by alloying Pt with less noble transition metals (e.g., Cu, Ni or Co etc.) that increase the ORR intrinsic activity and, at the same time, lower the amount of Pt used.

In recent years, record-breaking ORR activities of Pt-based electrocatalysts are being reported on an annual basis. In many cases, these activities are dramatically exceeding the proposed performance targets for 2020 (0.44 A $mg_{Pt}$@0.9 V; Department of Energy target). However, here it should be clearly noted that those high activities are achieved exclusively using thin film rotating disc electrode (TF-RDE) setups. Thus, none of the "record-breaking" activities have been transferred to "record-breaking" real PEMFC performances. One of the main reasons for this issue might be that their preparation method is based upon a polyol-type synthesis. While this type of synthesis enables a precise control over the shape of nanoparticles (i.e., allows creation of shape-controlled octahedral nanoparticles, nanoframes, nanowires, etc.), it also includes several inherent limitations such as (i) limitation to a milligram scale range per batch; (ii) long synthesis times; (iii) elevated temperatures or also elevated pressures (e.g. solvothermal synthesis); (iv) high cost of acetylacetonate Pt precursor; (v) usage of expensive complex organic solvents and surfactants that need to be removed via additional synthesis steps; (vi) the sequential nature of nanoparticles synthesis and their subsequent deposition on the supporting material; and (vii) any thermal annealing processes can induce undesired morphological changes at already mild temperatures and thus a loss of desired nanocrystals facets. A similar morphological instability was also observed at PEMFC relevant cathode conditions.

An alternative method for synthesis of supported Pt-based nanoparticles for the use in PEMFC is so-called galvanic displacement (GD) or transmetalation, which method is disclosed in US patent application 2012/0208108. What is commonly acknowledged in the case of GD-type synthesis is that a more noble metal cation spontaneously displaces a sacrificial less noble metal on top of the sacrificial metal itself. In order for that to occur, the sacrificial, less noble metal is in the metallic state. Furthermore, for achieving or rather maintaining the nanoparticle form after the GD reaction step, the sacrificial less noble metal needs to already be in the form of highly dispersed nanoparticles prior to the GD step of the synthesis. This makes the GD-type synthesis method, similarly to polyol-type synthesis, rather difficult to scale to an industrially relevant level.

Thus, there is a need for a simpler and a more economically favorable process for preparation of electrocatalyst material comprising noble metal, compared to the prior art methods. The object of the present invention is therefore to provide a method for preparation of a supported noble metal-alloy nanoparticle composite electrocatalyst that alleviates at least some of the limitations of the prior art technology.

SUMMARY OF THE INVENTION

The object of the present invention is realized by a new approach towards galvanic displacement (GD) reaction synthesis method by a double passivation method.

In a first aspect the present invention concerns a method for forming supported noble metal and/or noble metal-M alloy nanoparticle composite, M being a less noble metal galvanically displaced (GD) to deposit the noble metal, the method comprising the following steps:

(a) providing a M/S precursor material of metal M particles, on electrical conductive support particles, where M is one or more metal having lower standard electrode potential than the said noble metal;

(b) suspending the M/S precursor material in a liquid medium, the liquid medium having a pH at which an in-situ passivating oxide is thermodynamically formed at least on the surface of the metal M particles being exposed to the liquid medium, forming a passivated $MO_y/S$ suspension, y being >0 up to a stoichiometric M-oxide value;

(c) providing an adsorptive gas to the passivated $MO_y/S$ suspension, the adsorptive gas being selectively adsorbable on the noble metal to be deposited;

(d) adding a noble metal precursor to the passivated $MO_y/S$ suspension, thereby depositing as a reaction product crystalline noble metal nanoparticles and/or crystalline noble metal-M alloy nanoparticles on the support particles by a galvanic displacement reaction; and (e) separating and washing the as-synthesized reaction product.

The method according to the present invention is a double passivation GD method. The first passivation comprises spontaneously growth of a passivating oxide layer on the exposed surface metal particle M on support particle S. Without wishing to be bound by the theory it is believed that the technical effect of the passivating oxide layer is lowering the electron conductance between the liquid medium (e.g. water phase) and the less noble, sacrificial metal M, while maintaining ionic conductivity between the liquid medium and the $MO_y$ particles. Upon introduction of a noble metal precursor to the passivated $MO_y/S$ suspension, GD reaction between the noble metal precursor and the oxide-passivated metal M is initiated. Owing to the passivation of the less noble metal, this results in a favorable transport of electrons through the electric conductive support particle, while direct deposition of noble metal cations on the less noble, sacrificial metal M is substantially blocked. Direct deposition of the noble metal on the sacrificial metal M is therefore avoided, instead since the GD reaction takes place via the electrical conductive support particle, dispersed noble metal nanoparticles and/or noble metal-M alloy nanoparticles are deposited on the support particle. The second passivation comprises providing an adsorptive gas, which is selectively adsorbable on the surface of the noble metal. The technical effect of the second passivation is shielding (capping) of early stage formed noble metal nanoparticles and/or noble metal-M alloy nanoparticles. This prevents excessive particle growth, and promotes formation of new noble metal nanoparticles and/or noble metal-M alloy nanoparticles on new sites on the support particle. Hence, the as-synthesized nanoparticles produced with the present double passivation GD method are not core-shell type particles, such as produced according to the generally known GD method where the noble metal cation spontaneously displaces a sacrificial less noble metal on top of the sacrificial metal.

In an embodiment, the metal M of the M/S precursor in step (a) is at least partially oxidized on the surface, forming an ex-situ passivated M+MO/S precursor.

In an embodiment, the liquid medium is water, preferably purified water.

In an embodiment, the liquid medium is an alcohol of the general formula $C_nH_{2n+1}OH$ having 1-7 carbon atoms, preferably a $C_1$-$C_3$ alcohol, or a mixture thereof, or an aqueous solution of said alcohol(s).

In an embodiment, the pH of the liquid medium is adjusted before, during and/or after suspending the M/S precursor material and/or the at least partially ex-situ passivated M+MO/S precursor.

In an embodiment, the passivated $MO_y/S$ suspension is saturated with the adsorptive gas before addition of the noble metal precursor.

In an embodiment, the adsorptive gas is supplied and added into the $MO_y/S$ suspension from an external source.

In an embodiment, the liquid comprises an alcohol of the general formula $C_nH_{2n+1}OH$ having 1-7 carbon atoms, preferably a $C_1$-$C_3$ alcohol, or a mixture thereof, or an aqueous solution of said alcohol(s), in which the adsorptive gas is at least partially formed in-situ in the suspension.

In an embodiment, addition of the adsorptive gas is continued during the entire addition of the noble metal precursor.

In an embodiment, the noble metal precursor is a salt or the corresponding acid of the salt, soluble in the liquid medium.

In an embodiment, the noble metal precursor is chosen from the group comprising halide salts ($NM^{n+}Y_n$) (including both hydrates or anhydrous), alkali metal halide salts ($A_mNM^{n+}Y_{m+n}$) (including both hydrates or anhydrous) or corresponding hydrogen halide acids ($H_mNM^{n+}Y_{m+n}$) of the noble metal, where NM=noble metal; m=typical 1 or 2, n=typical 1, 2, 3 or 4, X=alkali metal cation $Li^+$, $Na^+$, $K^+$; Y=halide $F^-$, $Cl^-$, $Br^-$, $I^-$.

In an embodiment, the noble metal is Pt, Ir, Rh, Pd or Au.

In an embodiment, the adsorptive gas is carbon monoxide (CO), hydrogen ($H_2$), methanethiol (MeHS) or hydrogen sulphide ($H_2S$).

In an embodiment, the noble metal is Pt or Pd and the adsorptive gas is CO.

In an embodiment, the noble metal is Pd and the adsorptive gas is hydrogen gas.

In an embodiment, the less noble metal M is chosen from Cu, Ni, Co, Fe, Ag, Cr, Ti, Pb, Mo, W, Zn, Y, Gd, Pd or a mixture thereof.

In an embodiment, the less noble metal M is chosen from Cu, Ni, Co, Fe, Ag, Mo, W, Zn, Cr, Pb, Ti or a mixture thereof.

In an embodiment, the less noble metal M is chosen from Cu, Ni, Co or a mixture thereof.

In an embodiment, the support material is an electrical conductive material having an electrical conductivity greater than the conductivity of the formed passivating M-oxide, where the support material is selected form carbon material, ceramic material or a composite material.

In an embodiment, the carbon material is electrical conductive carbon particles, chosen from; carbon black, carbon nanotubes (CNTs), graphite or graphene, or derivatives thereof.

In an embodiment, the ceramic material is electrical conductive ceramic particles chosen from; antimony tin oxide (ATO), fluorine doped tin oxide (FTO), indium tin oxide (ITO) or titanium oxynitride ($TiO_xN_y$).

In an embodiment, the washing in step (e) includes re-dispersing the as-synthesized reaction product in fresh liquid medium and filtering at least once.

In an embodiment, the washed and filtered as-synthesized reaction product is dried.

In an embodiment, the method comprises further step (f) of thermal annealing the as-synthesized product.

In an embodiment, the thermal annealing step (f) is performed in an inert, oxygen-free and/or reducing atmosphere, at a temperature of between 450 to 1200° C.

In a second aspect the present invention concerns a composite material comprising noble metal and/or noble metal-M alloy nanoparticle, combined with $MO_y$, y being >0 up to a stoichiometric M-oxide value, on a support material S, where M is a less noble metal galvanically displaced by the noble metal in cationic state, the said composite material being the as-synthesized reaction product, obtainable by the method according to any of the embodiments according to the first aspect of the invention, except the thermal annealing step f), the said composite material comprising highly dispersed noble metal nanoparticles and/or noble metal-M nanoparticles on the support material.

In a third aspect the present invention concerns a composite material comprising noble metal nanoparticle and/or noble metal-M alloy nanoparticle, on a support material S, where M is a less noble metal galvanically displaced by the noble metal in cationic state, the said composite being obtainable by the method according to any of the embodiments according to the first aspect of the invention, including the thermal annealing step f), the said composite material comprising highly dispersed noble metal nanoparticles and/or noble metal-M nanoparticles on the support material.

In an embodiment of the invention according to the second or third aspect, the noble metal is Pt, Ir, Rh, Pd or Au.

In an embodiment of the invention according to the second or third aspect, the less noble metal M is Cu, Ni, Co, Fe, Ag, Cr, Ti, Pb, Mo, W, Zn, Y, Gd, Pd or a mixture thereof.

In an embodiment of the invention according to the second or third aspect, the less noble metal M is chosen from Cu, Ni, Co, Fe, Ag, Mo, W, Zn, Cr, Pb, Ti or a mixture thereof.

In an embodiment of the invention according to the second or third aspect, the less noble metal M is chosen from Cu, Ni, Co or a mixture thereof.

In an embodiment of the invention according to the second or third aspect, the support material is an electrical conductive material selected form carbon material, ceramic material or a composite material.

In an embodiment of the invention according to the second or third aspect, the carbon material is electrical conductive carbon particles, chosen from; carbon black, carbon nanotubes (CNTs), graphite or graphene, or derivatives thereof.

In an embodiment of the invention according to the second or third aspect, the ceramic material is electrical conductive ceramic particles chosen from; antimony tin oxide (ATO), fluorine doped tin oxide (FTO), indium tin oxide (ITO) or titanium oxynitride ($TiO_xN_y$).

In an embodiment of the invention according to the second or third aspect, the noble metal is Pt, the M is one or more of Cu, Ni or Co, and the support material is carbon black.

In a fourth aspect, the present invention concerns the use of a composite material, according to any one of the embodiments according to the second aspect of the invention, as an electrocatalyst in an electrochemical energy conversion device.

In a fifth aspect, the present invention concerns the use of a composite material, according to any one of the embodiments according to the third aspect of the invention, as an electrocatalyst in an electrochemical energy conversion device.

In an embodiment of the usage of the composite material, the electrocatalyst is a carbon supported Pt-M alloy nanoparticle electrocatalyst in a PEM fuel cell.

The present invention will become apparent from the detailed description given below. The detailed description and specific examples disclose preferred embodiments of the invention by way of illustration only. Those skilled in the art understand from guidance in the detailed description that changes and modifications may be made within the scope of the invention as defined in the appended claims.

Hence, it is to be understood that the herein disclosed description of the invention is not limited to the particular described steps of the method since such method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Furthermore, the words "comprising", "including", "containing" and similar wordings does not exclude other elements or steps.

BRIEF DESCRIPTION OF DRAWINGS

FIG. 10: XRD analysis of (a) PtCu+CuO/C composite after GD reaction of Cu/C with $K_2PtCl_4$ in the absence (PtCu+CuO/C analogue, example 3) or presence (PtCu+CuO/C—CO analogue, example 2) of CO gas; and (b) $PtCu_3$/C electrocatalysts obtained after subsequent thermal annealing at 800° C. in Ar atmosphere of both analogues ($PtCu_3$/C and $PtCu_3$/C—CO). STEM BF and HAADF images of (c) PtCu+CuO/C (Example 3) and (d) PtCu+CuO/C—CO (Example 2) obtained after GD step of the synthesis as well as (e) $PtCu_3$/C and (f) $PtCu_3$/C—CO analogues obtained after subsequent thermal annealing at 800° C. in Ar atmosphere; g) and h) show (g) $ECSA_{CO}$ integrated from (h) CO stripping CVs in 0.1 M $HClO_4$ comparing both $PtCu_3$/C (Ex. 3) and PtCu$_3$/C—CO (Ex. 2) analogues. ECSA$_{CO}$ was measured after 200 cycles of in-situ EA (0.05-1.2 V vs. RHE, 300 mV/s).

DETAILED DESCRIPTION OF THE INVENTION

The above objects, as well as additional objects, features and advantages of the present invention, will be more fully appreciated by reference to the following illustrative and non-limiting detailed description and example embodiments of the present invention.

The present method is a simpler and a more economically favorable process for preparation of electrocatalyst materials comprising noble metal (noble metal may also be abbreviated "NM" herein), compared to the prior art methods. The present method is based on a "double passivation" galvanic displacement (GD) synthesis method for production of high performance supported noble metal-M alloy electrocatalysts, where M is an electrochemically less noble metal, compared to the noble metal, in a GD process.

As known to the skilled artisan, the nobility of a metal is determined by its standard potential (also referred to as "standard electrode potential" or "standard reduction potential"). The standard potential is the measure of the individual potential of a reversible electrode at standard state, i.e. with solutes at an effective concentration of 1 mol dm$^{-3}$ and gases at a pressure of 1 atm. Values for standard potentials of all common metals are tabulated at 25° C. and with reference to a standard hydrogen electrode (SHE). Metals having a higher standard potential (that is a more positive standard potential) are more noble than metals with a lower standard potential. The nobility of a metal with respect to other metals thus can easily by determined by the position of the metal within the so called galvanic series, which lists the individual metals based on their standard potentials. Tables of standard potentials can be found for instance, in Allen J. Bard and Larry R. Faulkner: "Electrochemical Methods, Fundamentals and Applications" 2001, 2$^{nd}$ Edition, ISBN 978-0-471-04372-0, John Wiley & Sons, Inc., pages 808-809; Therefore, the term "less noble metal", as used in the present context, refers to the different standard electrode potential between the two metals; the noble metal (NM) and the alloying (sacrificial, "less noble") metal (M), in an electrolyte, wherein the less noble metal will be galvanically corroded (displaced) due to a lower electrode potential than the nobler one (the noble metal). The noble metal is in ionic state (cation), while the sacrificial, less noble metal is in the metallic state passivated by an oxide layer.

Figure 1:
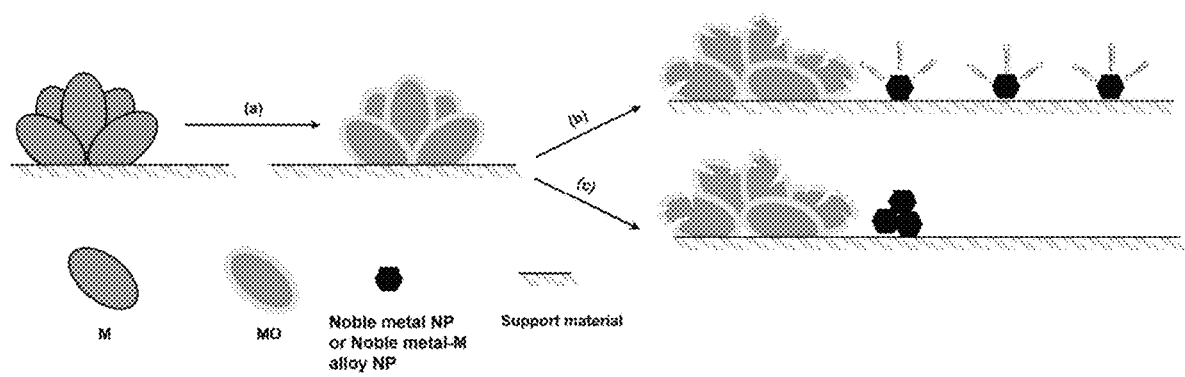
FIG. 1: Illustrates the double passivation steps in the GD synthesis method according to the present invention.

The present "double passivation" method using GD reaction of a less noble, sacrificial metal M deposited on a support material (herein generally denoted M/S, S=support material) with a noble metal precursor in a liquid media provides a high quality dispersion of noble metal-M alloy nanoparticles on support particles. The double passivation GD method according to the present invention is schematically illustrated in FIG. 1, illustrating the addition of a noble metal precursor in a liquid, e.g. an aqueous. M/S suspension, the M particles having an oxide layer on the free surface, exposed to the liquid, saturated with an adsorptive gas (herein exemplified with carbon monoxide) interacting with the noble metal. The overall method steps (a) to (e), and an additional annealing step (f), are also illustrated in the flowchart in FIG. 15 and explained in detail below.

The term "adsorptive gas" used herein refers to a gas capable of adsorption to the noble metal and the noble metal-M alloy, in particular a gas capable of chemisorption to the metallic noble metal. The molecules of the gas are preferably capable of forming a chemical bond with the metallic noble metal sites. The adsorptive gas may also be termed "capping gas", "shielding gas" or "passivating gas" herein.

The first passivation in the present double passivation GD synthesis is passivation of the M/S precursor (M=metal or partially oxidized metal deposited on support particles) by the formation of a surface M-oxide layer on the metal M, FIG. 1(a). The formation of the surface M-oxide layer has the effect of passivation of the liquid medium (electrolyte)/M interface, while the M/S interface remains oxide free, hence, in a galvanic displacement reaction the M/S interface becomes the preferred route for the electrons. In other words, the surface oxide layer of M is less conductive than the support particles and the electrons are thereby forced to travel via the support particles. Consequently, by the addition of a noble metal precursor, galvanic displacement does not occur on the metal M itself, but rather noble metal starts to deposit on the support particles, while the metal M having a passivating oxide layer on its surface is corroded. Preferably, the entire surface of the metal M, exposed to the liquid medium, is passivated by an oxide layer.

The second passivation is capping (also denoted shielding) of the deposited noble metal and/or noble metal-M alloy nanoparticles with an adsorptive gas adsorbed on the surface of the newly formed, deposited noble metal nanoparticles and/or the noble metal-M alloy nanoparticles, see FIG. 1(b). The present method utilizes a noble metal-adsorptive gas interaction, wherein a gas adsorbed on the noble metal is used as a capping agent restricting noble metal nanoparticles to grow during the GD reaction. The capping of the deposited noble metal nanoparticles suppresses further deposition of noble metal on already formed noble metal and/or noble metal-M alloy nanoparticles, leading to formation of new noble metal and/or noble metal-M alloy nanoparticles on new sites on the support particles instead. This approach not only results in synthesis of very small as well as well dispersed and already deposited nanoparticles, but is also very energy efficient and requires no additional steps for any surfactant removal.

FIG. 1(c) illustrates GD deposition of noble metal without the presence of an adsorptive gas, wherein the deposited noble metal and/or noble metal-M alloy nanoparticles grow to larger particles.

Figure 15:
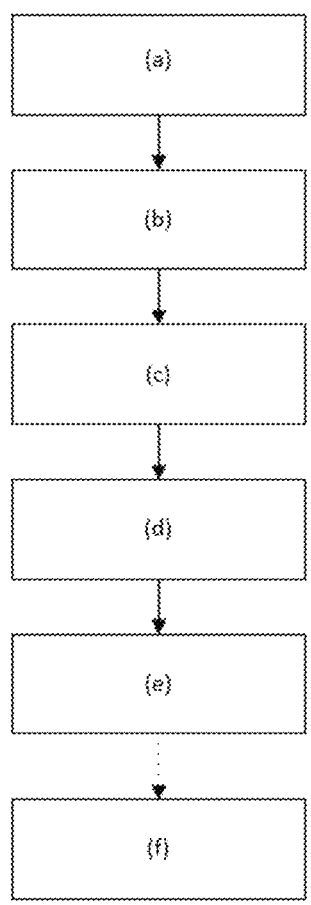
FIG. 15: Flowchart illustrating the double passivation GD method steps according to the invention.

The present double passivation GD method for the preparation of supported noble metal-M alloy nanoparticles composite, where M is a sacrificial metal, galvanically displaced to deposit the noble metal, will in the following be explained in detail, and comprises the following steps (as illustrated in FIG. 15):

(a) In a first step a precursor material of crystalline metal M on an electrical conductive support material S, generally denoted M/S, is provided. The metal M is a metal less noble than the noble metal in ionic state, meaning the metal M has a standard electrode potential that is lower than the standard electrode potential for the noble metal ions. Suitably, the metal M is one or more metal selected from the following group; Cu, Ni, Co, Fe, Ag, Cr, Ti, Pb, Mo, W, Zn, Y, Gd and Pd, preferably Cu, Ni, Co, Fe, Ag, Mo, W, Zn, Cr, Pb, Ti even more preferably Cu, Ni, Co. The precursor M/S can be produced by any generally known methods for depositing a metal on a support material, e.g. a sol-gel method, impregnation method, chemical precipitation method, pulse combustion method (thermoacoustic reactor), etc. The metal M can be deposited on the support material in any form and morphology. The particle size, and particle size distribution, of the metal M on the carbon support is not critical and may vary from nanometer size to micron size, e.g. from about 1 nm to about 20 μm, e.g. 50 nm to about 20 μm. In fact, one important advantage of the process according to the present invention is that the metal particles M in the M/S precursor composite do not have to be in the nano size, but can be present in the micron size range. In addition, an M/S precursor composite wherein the metal M is in the form of nanoparticles, e.g. from 1 to 2 nm, on the support particle has also shown an important effect in that the as-synthesized product resulting from the present double passivation GD method comprises very homogenely dispersed nanoparticles. M/S precursor composite wherein the metal M is in the form of nanoparticles, e.g. from 1 to 2 nm, can be obtained by using a thermoacoustic/pulse combustion reactor, any other method known in the field.

The M/S precursor material can be mechanically worked in the presence of oxygen, such as ball milling, or grinding, during which mechanically working process the metal particles on the support material can be oxidized or at least partially oxidized on its surface. The M/S precursor may alternatively be annealed in presence of oxygen, thereby forming a metal oxide at least on parts of the surface of the metal M. Partially oxidized M/S precursors can also be achieved from the synthesis method itself, such as by the thermoacoustic/pulse combustion reactor. Such initial formed oxide layer on at least parts of the metal M surface of the M/S precursor, generally referred to as M+MO/S, is herein denoted an ex-situ passivating oxide layer. It should be understood that an ex-situ M-oxide layer can be formed by any known oxidizing method. In the present application, the term M/S precursor should be understood to include also at least partially oxidized metal M on support material; M+MO/S, unless other stated.

The support material (S) is a particulate material having electrical conductivity larger than any formed passivating M-oxide layer of the metal M deposited thereon. The supporting material should have a conductivity larger than $10^{-15}$ S/cm, preferably larger than $10^{-7}$ S/cm and the most preferably larger than 0.03 S/cm. The support material must be a stable and inert material, withstanding synthesis conditions and conditions in electrochemical cells, in which the deposited noble metal-M alloy nanoparticle material is used as a catalyst. Further, the support material should tolerate high temperatures (>1200° C.). Preferably the support material has a surface area of at least 10 m$^2$/g, such as at least 20 m$^2$/g, or at least 50 m$^2$/g. The support material (S) can be an electrical conductive carbon material, a conductive ceramic material or a conductive composite material. A carbon support material should be selected from the group consisting of carbon blacks, Carbon nanotubes (CNTs), graphene, graphite, or other conductive carbon materials, as well as modifications/derivatives thereof. The carbon support material should have a surface area of at least 10 m$^2$/g, preferably at least 20 m$^2$/g, more preferably at least 50 m$^2$/g. The carbon support should have a surface area of at most 3000 m$^2$/g, e.g. at most 1000 m$^2$/g, or at most 800 m$^2$/g, such as at most 500 m$^2$/g, at most 250 m$^2$/g, at most 200 m$^2$/g or at most 150 m$^2$/g. For instance, the carbon support has a surface area between 10 m$^2$/g and 3000 m$^2$/g, preferably between 10 m$^2$/g and 1000 m$^2$/g, e.g. between 20 and 800 m$^2$/g, or between 50 and 200 m$^2$/g. The surface can be determined via physisorption of N$_2$, with the BET-Method (Brunauer-Emmett-Teller-Method).

A ceramic support material is an electrical conductive ceramic, e.g. antimony tin oxide (ATO, Sb$_2$SnO$_5$), fluorine doped tin oxide (FTO, F:SnO$_2$), indium tin oxide (ITO, (In$_2$O$_3$):(SnO$_2$)) or titanium oxynitride (TiO$_x$N$_y$). The ceramic support material should have a surface area of at least 10 m$^2$/g. For instance, the ceramic support has a surface area between 10 m$^2$/g and 200 m$^2$/g, such as between 10 m$^2$/g and 100 m$^2$/g. The surface can be determined via physisorption of N$_2$, with the BET-Method (Brunauer-Emmett-Teller-Method). The support material may also be a composite material, e.g. ceramic-carbon composite. The surface area of a composite material should be as indicated above for a carbon support material.

Figure 3:
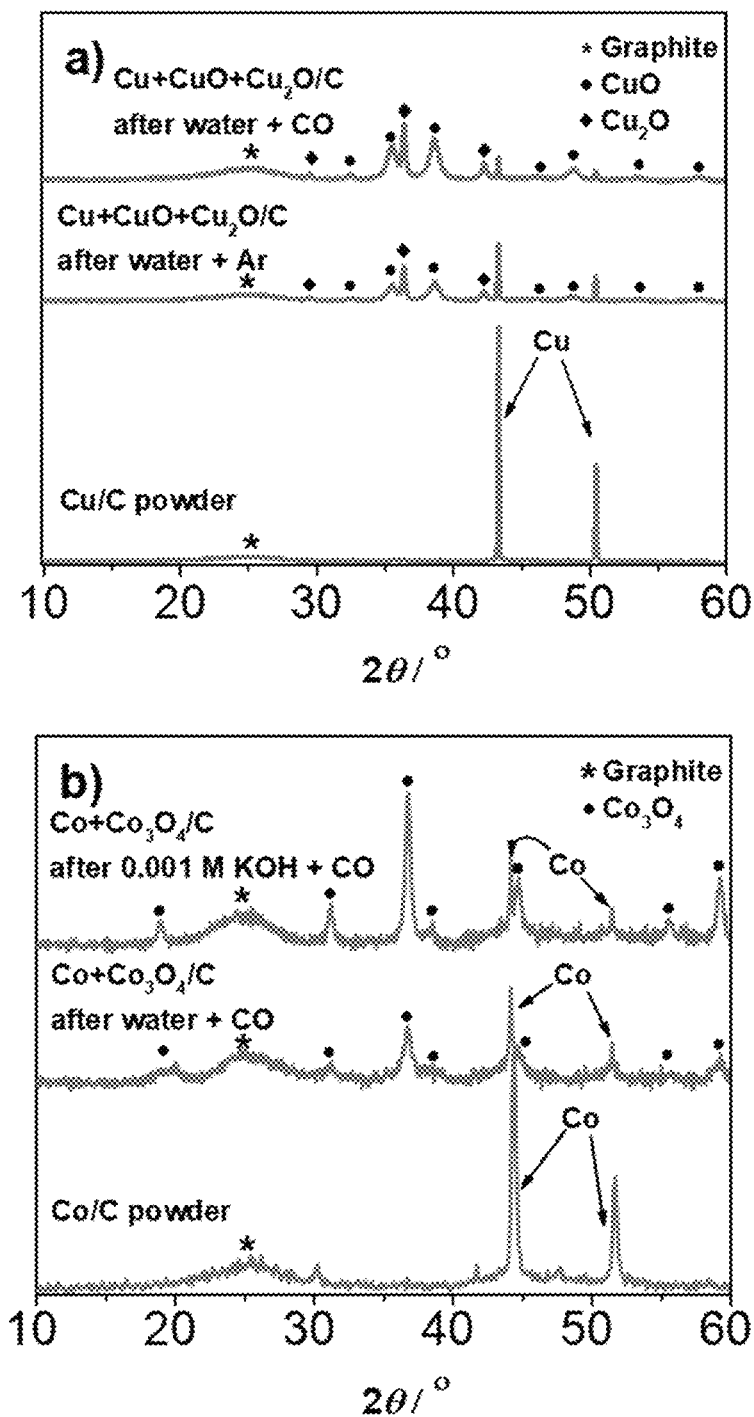
FIG. 3: a) Results from tests 1 and 2, in-situ formation of passivating Cu-oxide layers on Cu precursor on carbon support. b) Results from tests 3 and 4, in-situ formation of passivating Co-oxide layer on Co precursor on carbon support.

(b) The M/S precursor, possibly comprising ex-situ passivated oxide layer; M+MO/S precursor, is suspended in a liquid medium, suitably a water based medium. The water can be tap water, however since salts present in tap water can influence the experimental conditions, the water is advantageously distilled water or deionized water (high purity water). The liquid medium can also be based on a water soluble alcohol of the general formula $C_nH_{2n+1}OH$, chosen from alcohols having 1-7 carbon atoms; $CH_4O$ to $C_7H_{16}O$, preferably a $C_1$-$C_3$ alcohol; $CH_4O$ to $C_3H_8O$. The liquid medium may also be a mixture of water and a water miscible alcohol having 1-7 carbon atoms; $CH_4O$ to $C_7H_{16}O$. The pH of the liquid may be adjusted such that an oxide layer of the metal M is thermodynamically formed on the metal surface when the M/S precursor is suspended in the liquid, herein denoted in-situ passivation, forming a passivated MO$_y$/S suspension, y being >0 up to a stoichiometric M-oxide value. Throughout this specification it should be understood that the passivated metal M has an oxide layer at least on the entire surface exposed to the liquid. In electrochemistry, Pourbaix diagrams, also known as a potential/pH diagram or pE/pH diagram, maps out possible stable phases of an aqueous electrochemical system. Pourbaix diagrams are also known as EH-pH diagrams due to the labeling of the two axes. The vertical axis is labeled EH for the voltage potential with respect to the standard hydrogen electrode (SHE) as calculated by the Nernst equation. The horizontal axis is labeled pH for the −log function of the H⁺ ion activity. A Pourbaix diagram indicates regions (pH) where a metal is not attacked (immune), passivated by the formation of a stable coating of oxide (or other salt) on the surface, or attacked (corroded). The formation of a passivating metal oxide, MO, on the metal M occurs thermodynamically at the liquid-metal interface, as the pH in the suspension is adjusted according to the oxide formation conditions. Rule of thumb is if oxide formation thermodynamically occurs at higher pH, a more basic medium is needed. Therefore, e.g. Ni and Co need a higher pH for the formation of an oxide layer than e.g. Cu. It should be noted that the time for formation of an in-situ passivating M-oxide layer may vary. Some metals may be rapidly oxidized and the oxide is formed instantly with suspending the M/S precursor in the liquid medium. Other metals might be oxidized more slowly, and the passivating reaction needs more time to be complete. Formation of M-oxide can occur immediately after suspending M/S in liquid media, e.g. after 1 minute, 15 minutes or even after 1 hour. The time for oxide formation should be less than 1 week, preferably up to 1 day, and most preferably up to 3 hours. The precursor may also be at least partially ex-situ passivated before being suspended in the liquid media. In such case the liquid media should have a pH in which the passivated M-oxide layer is maintained. The skilled person will be able, by the use of routine work, to find out suitable time and pH required for the formation of a passivating layer on specific metals M, reference is also made to the examples. Tests performed by the inventors demonstrates the formation of a passivating M-oxide layer on the M/S precursors, see tests 1-4 (described below) and FIG. 3 a) and b).

The suspended supported metal M having at least a passivating M-oxide surface layer (formed ex-situ and/or in-situ) is generally denoted $MO_y/S$ herein, where y is >0 to a stoichiometric value for a M-oxide, in the following. It should be understood that an oxide layer is formed at least on the entire surface exposed to the liquid medium, i.e. on the liquid medium-metal interface metal surface. The mass concentration of the M/S precursor in the liquid medium may vary. In general, a suitable addition rate of M/S precursor in the liquid, forming the suspension, is between 10 mg/L to 250 g/L liquid. For practical reasons, the amount of M/S precursor in the liquid suspension may be at least 1 g/L, e.g. at least 5 g/L or 10 g/L.

(c) To the $MO_y/S$ suspension, where the metal supported on a support material has an ex-situ and/or in-situ passivating oxide layer, formed in step (b) a gas that interacts with the noble metal is provided. The gas may be provided by adding into the liquid, e.g. gas purging, from an external source, or it can be at least partially formed in-situ. By gas purging, it should be understood, bubbling or dispersing gas into the liquid medium. The gas purging should preferably be continued until saturation of the gas in the liquid. The expression "gas which interacts with the noble metal" it should be understood as a gas which is (selectively) adsorbed on the noble metal surface and/or noble metal-metal M alloy surface, also denoted "adsorptive gas", "capping gas", "shielding gas" and "passivation gas" herein. Preferably the suspension is continuously mixed during addition of the adsorptive gas, e.g. by mechanical stirring, such as a magnetic stirrer, a pithed blade turbine stirrer, a propeller stirrer, a Rushton turbine stirrer or other known stirrer. The speed of the stirrer may be varied, e.g. within a range of 5 rpm to 1000 rpm (rpm=rotations per minute), such as from 10 rpm to 250 rpm. The mixing may also be accomplished by the agitation by the continuous bubbling of the adsorptive gas. The adsorptive gas is selected from carbon monoxide gas (CO), hydrogen gas ($H_2$), hydrogen sulphide gas ($H_2S$) and methanethiol (MeSH). In a synthesis where the noble metal is Pt, Ir, Rh or Pd, the adsorptive gas should preferably be selected from CO or $H_2$. If the noble metal is Au, the adsorptive gas should preferably be $H_2S$ or methanethiol. Thus, the noble metal+adsorptive gas combinations for the synthesis may be selected from:

Ir+CO gas; Ir+$H_2$ gas; Rh+CO gas; Rh+$H_2$ gas; Pd+CO gas; Pd+$H_2$ gas; Pt+CO gas; Pt+$H_2$ gas; Au+$H_2$S; Au+methanethiol.

Preferably the adsorptive gas in a synthesis with Pt as the noble metal is CO. In a liquid medium comprising water soluble alcohols platinum may decompose the alcohol, forming intermediates of CO gas. Thus, the capping agent (gas) can also at least partially be formed in-situ and reducing or avoid adding CO gas from an external source. Alternatively, the adsorptive CO gas can be supplied both from an external source combined with in-situ formation. Correspondingly as explained above, the suspension should be stirred to achieve homogenous conditions throughout the suspension.

(d) After formation of a suspension of passivated $MO_y/S$, and saturation of the suspension with the absorptive gas, the method further comprises addition of the noble metal precursor (i.e. noble metal cations) to the adsorptive gas saturated $MO_y/S$ suspension. By addition of noble metal precursor crystalline noble metal nanoparticles and/or crystalline noble metal-M alloy nanoparticles are deposited on the support particles by a galvanic displacement reaction, as explained above. The saturation of the adsorptive gas should be maintained in the suspension during the entire addition of the noble metal precursor to ensure passivation of the formed noble metal and/or noble metal-M alloy nanoparticles by (selective) adsorption of passivating gas. Suitable noble metal precursors include noble metal salts and their corresponding acids, soluble in a water based medium, or alternatively in an alcohol, as specified above in step (b). The noble metal precursor can be added in solid form or as a solution containing the dissolved noble metal precursor. Halide salts ($NM^{n+}Y_n$) (both hydrates or anhydrous), alkali metal halide salts ($A_m NM^{n+}Y_{m+n}$) (both hydrates or anhydrous) or corresponding hydrogen halide acids ($H_m NM^{n+}Y_{m+n}$) of the noble metal are especially suitable, as many of these are generally water soluble (NM=noble metal; m=typical 1 or 2, n=typical 1, 2, 3 or 4, X=alkali metal cation Li⁺, Na⁺, K⁺; Y=halide F⁻, Cl⁻, Br⁻, I⁻). The addition rate of the precursor is not critical, and the noble metal may be added all at once, or e.g. by using a pump wherein the total amount of noble metal precursor is added over a time. Preferably the mixing should be adequate in relation with the speed of addition, such that the noble metal precursor reacts equally across the entire $MO_y/S$ precursor. This results in a homogenous and well dispersed growth of noble metal nanoparticles and/or noble metal-M alloy nanoparticles on the support material without substantial local variations in metal loading. The rate of addition of the noble metal precursor may be at least 1 mL/h, e.g. between 10 mL/h and 3600 mL/h, such as 50 to 350 mL/h. Without being bound by the theory, it is believed that a small gap in the standard electrode potential between the noble metal cation and the less noble metal leads to slower reaction kinetics compared to a large gap in the standard electrode potential. Based on this, if the gap in the standard electrode potential between the noble metal cation and the less noble metal is small, the addition rate of the noble metal precursor should be slower compared to the addition rate when the noble metal cation and the less noble metal has a large gap in the standard electrode potential. The amount of noble metal precursor added per mass of the $MO_y/S$ in the suspension may vary depending on the desired composition of the noble metal-M alloy nanocomposite end product. The noble metal:M ratio (i.e. the chemical composition of the produced alloy product) depends on: 1) the total added mass of noble metal precursor (i.e. different fractions of available M in the M/S precursor can be displaced), 2) the amount (wt %) of M in the M/S precursor and 3) the stoichiometry of the galvanic displacement reaction between the noble metal and M (e.g. 1:1 stoichiometry for Pt and Cu; $Pt^{2+}+Cu^0 \rightleftharpoons Pt^0 + Cu^{2+}$). The suspension should be continuously mixed during addition of the noble metal precursor, e.g. by mechanical stirring, such as a magnetic stirrer, a pithed blade turbine stirrer, a propeller stirrer, a Rushton turbine stirrer or other known stirrer. The speed of the stirrer may be varied, e.g. within a range of 5 rpm to 30 000 rpm (rpm=rotations per minute), such as from 10 rpm to 1000 rpm. The mixing may also be achieved by agitation by the continuous bubbling of adsorptive gas. If the process is performed under elevated pressure or if the adsorptive gas is formed in-situ, ref step (b) above, or the capping agent is not a gas, agitation with ultrasound is also possible.

(e) After entire noble metal precursor is added to the reaction mixture, optionally maintaining the mixing of the suspension for some time until reactions are complete, the suspended product is thereafter separated from the liquid, and the product is washed e.g. by re-dispersing the reaction product in fresh liquid medium. The separation can be made by any known means, such as filtrating, centrifugation, decantation. Separation by centrifugation is preferred. The centrifugation and washing may be repeated until all soluble side products are removed from the product, e.g. 2-4 times, or more if necessary. Any washing step may also involve heating the washing liquid, e.g. boiling of the suspension. Any remaining impurities can be detected using EDX SEM, while crystalline impurities will also be visible on XRD diagrams, which should only show the crystal phases comprising of noble metal, the less noble M, O present in metal oxide, and elements of the support material. The thus obtained noble metal or noble metal-M alloy+$MO_y/S$ reaction product is subsequently dried according to generally known methods. The as-synthesized product comprises deposited noble metal and/or noble metal-M alloy nanoparticles together with remaining $MO_y$ particles on the support particles, the $MO_y$ particles being less noble metal M particles having at least a partially oxide surface layer, hence y is >0 up to a stoichiometric M-oxide value. In an embodiment the as-synthesized product comprises deposited noble metal and/or noble metal-M alloy nanoparticles together with remaining $MO_y$ particles on carbon support particles, such as carbon black. The product is characterized in that the deposited noble metal nanoparticles and/or noble metal-M alloy nanoparticles are very well dispersed on the support material, having a narrow size distribution of only a few nanometers, mostly below 10 nm, or even 5 nm. Hence, contrary to reaction products formed by a traditional GD method, the formed nanoparticles by the present double passivation GD method are not in the form of core-shell type particles. Rather, the deposited noble metal nanoparticles and/or noble metal-M alloy nanoparticles and the remaining $MO_y$ particles are distributed separately on the supporting material.

(f) The dried noble metal and/or noble metal-M alloy+ remaining $MO_y/S$ product can be further treated by thermally annealing in an inert or reducing atmosphere. The purpose of thermal annealing is alloying the remaining $MO_y$ particles, which becomes thermally reduced to elemental M, with the noble metal and/or noble metal-M alloy nanoparticles, and possibly ordering of the noble metal-M alloy crystal lattice. The dry reaction product may be placed in an inert refractory crucible sealed in a high temperature stable container, such as a quartz tube, and purged by an oxygen-free gas, such as an inert gas, e.g. Ar, or a reducing gas (e.g. CO), or a mixture if inert gas and a reducing gas, e.g. $Ar/H_2(5\%)$. The temperature for thermal annealing is at a level effecting reduction of $MO_y$ to M. Without being bound by the theory it is believed that the metal oxide is reduced by reaction with carbon support material, in cases where carbon is used as support material. Typically, the annealing temperature is between 450-1200° C., e.g. between 500 and 900° C., preferably 600-800° C. Treatment time and temperature may vary, and may be seconds to weeks. For practical reasons, the thermal annealing treatment time may be from 1 minute to a week, preferably from 1 minute to 1 day. The annealing treatment time depends on the temperature and the metals in the alloy. When annealing at 450° C. the alloying process can be very slow, especially in specific metals which do not mix very well (for example Ni is more difficult to alloy with Pt than Cu). On the other hand, if a higher temperature is used, e.g. 800° or above, the kinetics may become so fast that only one, or a few seconds, at the upper temperature is already enough. The sealed container is preferably purged with an inert (e.g. Ar or $N_2$) or reducing gas (e.g. $Ar/H_2(5\%)$ mixture or CO) during the entire thermal annealing treatment. Heating rate is not critical, and can be very slow (for example 0.1 K/min) to as fast as possible (for example the product material is introduced in a pre-heated furnace). The heating rates should typically be between 1 and 30 K/min, such as between 2 and 15 K/min.

The cooling rate may be important to control as slower cooling can result in more ordering of the crystal lattice of the nanoparticles. Thus, cooling can be from as slow as 0.1 K/min to as fast as one can cool in liquid nitrogen. Typically, the cooling rate should be from 1 to 20 K/min, such as from 3 to 10 K/min. It should also be understood that ordering of the nanocrystal particles can also be achieved during the thermal annealing, e.g. by using different annealing temperatures and holding times, before cooling, or combined with controlled cooling.

The GD synthesis according to the present invention, i.e. steps b) to e), can be performed at normal temperature (room temperature) and at normal pressure (1 atm). The temperature for the said synthesis steps may also be higher than room temperature. Advantages of raising the temperature are 1) kinetics of the reactions become faster and 2) solubility of most noble metal precursors (salts and their corresponding acids) becomes higher. On the other hand, solubility of gases becomes lower at higher temperatures. However, the process can be performed under higher than ambient pressure which can increase the solubility of most gases and thus circumvent the lower solubility of gases at higher temperature.

The double passivation GD synthesis according to the present invention has several advantages over the prior art polyol-type synthesis methods: (i) the method according to the present invention can be performed in an aqueous and/or in a water soluble alcohol media (i.e. the method does not involve complex organic solvents); (ii) the method according to the present invention can be performed at room temperature and ambient pressure because it exploits a spontaneous processes (first passivation, GD reaction as well as second passivation), making it very energy efficient; (iii) the nanoparticles synthesis and deposition (dispersion on the supporting material) take place within the same synthesis step (noble metal nanoparticles grow on the supporting material itself); (iv) the precursors used in the present synthesis are significantly cheaper than the typical precursors used in the prior art methods (e.g. $Pt(AcAc)_2$ used in the polyol-type synthesis); and further (v) the present method allows easy scalability to gram batch scale, which is important for commercial production. The double passivation GD synthesis according to the present invention also has an important advantage over the prior art GD synthesis methods: the size and morphology of the sacrificial less noble metal is not important because the GD reaction is not performed on top of the less noble metal and instead this path for electrons is blocked with first passivation. This makes the synthesis of precursor M/S materials inherently more simplified as well as increases their commercial availability. The second passivation, on the other hand, blocks the second path for electrons, blocking GD reaction also via in the early stages of GD formed noble metal nanoparticles and/or noble metal-M alloy nanoparticles. The present double passivation process wherein two out of three paths for electrons (first being via the sacrificial less noble metal and second being via noble metal nanoparticles and/or noble metal-M alloy nanoparticles) are blocked out intrinsically enables for perfect dispersion of noble metal nanoparticles and/or noble metal-M alloy nanoparticles as the only remaining path for electrons is via the supporting material. Thus, over the course of noble metal precursor addition and GD reaction, noble metal nanoparticles and/or noble metal-M alloy nanoparticles are always formed on the fresh spots of the supporting material. This cannot be achieved with any other known method.

Furthermore, simple flexibility when going from one material design to another is also not possible with other methods. The prior known methods for depositing nanoparticles made by polyol as well as other methods on supporting material requires adjusting the zeta potential to make sure that the noble metal nanoparticles and/or noble metal-M alloy nanoparticles repel each other, while noble metal nanoparticles and/or noble metal-M alloy nanoparticles and supporting material attract each other. Based on the prior art methods, because it is difficult to perfectly control zeta potential none are able to perform such adjustment perfectly and there will be at least a fraction of noble metal nanoparticles and/or noble metal-M alloy nanoparticles that do not repel and end up agglomerating between each other. The present double passivation GD process does not have to rely on zeta potential and thus, the method can readily be adapted for different material designs (e.g. changing of the NM and/or sacrificial metal M, adjustment of the supporting material S, adjustment of the total NM+M loading, adjustment of the NM and less noble metal M ratio). This is because the noble metal nanoparticles and/or noble metal-M alloy nanoparticles formed via GD reaction crystallize directly on the surface of supporting material where the NM-precursor salt receives the electrons. Thus, only blocking other available paths for traveling of electrons during GD reaction is important for the double passivation method.

The crystalline noble metal nanoparticle and/or noble metal-M alloy nanoparticle material on support particles S produced by the present method including a thermally annealing step comprises an alloy of a noble metal chosen from Pt, Ir, Rh, Pd or Au, and one or more metal M, chosen from Cu, Ni, Co, Fe, Ag, Cr, Ti, Pb, Mo, W, Zn, Y, Gd and Pd. The noble metal-M alloy nanoparticles should have an average particle diameter ranging from 1 to 200 nm. If the particle size is very small the stability of the noble metal-M alloy nanoparticles (e.g. platinum-alloy catalyst under fuel cell operation) is very low. Particles with a diameter below 1 nm may not be very stable when used as a catalytic material. On the other hand, if the particle size is very large, the noble metal is utilized poorly as a catalyst, since only surface atoms participate in the catalytic reactions, and the mass activity is consequently low. Therefore, the produced noble metal nanoparticles and/or noble metal-M alloy nanoparticles should have an average particle diameter ranging from about 1 to about 20 nm, preferably the particle diameter is ranging from 2 to 7 nm, such as 3 to 5 nm. The products prepared according to the present method are particularly suitable as an electrocatalyst material in electrochemical energy conversion devices.

A Pt-M alloy on support material S, produced by the method according to the present invention is especially suitable as an electrocatalyst material in a PEM Fuel Cell (both the cathode and the anode), while for example, supported Iridium-M alloys can be used in a PEM electrolyzer (reverse reaction to PEM Fuel Cell) for the cathode. It has also been reported that Au—Cu alloy works as a catalyst for carbon dioxide reduction. Thus, noble metal alloys have a wide range of application within the group of electrochemical energy conversion devices.

The supported noble metal nanoparticles and/or noble metal-M alloy nanoparticles products produced by the present method (incl. thermally treatment step) are suitable for use as catalyst materials in electrochemical energy conversion devices, such as electrolytic production cells, e.g. Proton Exchange Membrane (PEM) electrolyzers, and fuel cells, e.g. PEM fuel cells. Correspondingly, the as-synthesized (not thermally treated) supported noble metal-M alloy nanoparticles combined with remaining $MO_y$ particles (y being from >0 to a stoichiometric value for the corresponding metal oxide) produced by the present method are also suitable for use as catalyst materials in electrochemical energy conversion devices, such as electrolytic production cells, e.g. Proton Exchange Membrane (PEM) electrolyzers, and fuel cells, e.g. PEM fuel cells. As is generally known in the art, as-prepared electrocatalyst material might have to be activated prior to use, e.g. by removal of the less noble metal on the surface of the nanoparticles, generally referred to as "catalyst activation". Catalyst activation of electrocatalyst material is generally described below.

It should be noted that for all M/S precursor materials, $MO_y/S$ (y being >0 to a stoichiometric value for the corresponding metal oxide), noble metal nanoparticles and/or noble metal-M alloy nanoparticles on substrate material S, and as-synthesized (not thermally treated) supported noble metal nanoparticles and/or noble metal-M alloy nanoparticles, combined with remaining $MO_y$ particles (y being from >0 to a stoichiometric value for the corresponding metal oxide) on substrate material S, the supporting material S can be a carbon support material, selected from the group consisting of carbon blacks, Carbon nanotubes (CNTs), graphene, graphite, or other conductive carbon materials, as well as modifications thereof, which can be generally denoted M/C precursor materials, and $MO_y/C$ (y being >0 to a stoichiometric value for the corresponding metal oxide). Correspondingly, it should be noted that that for all M/S precursor materials, $MO_y/S$ (y being >0 to a stoichiometric value for the corresponding metal oxide), noble metal nanoparticles and/or noble metal-M alloy nanoparticles on substrate material S, and as-synthesized (not thermally treated) supported noble metal nanoparticles and/or noble metal-M alloy nanoparticles, combined with remaining $MO_y$ particles (y being from >0 to a stoichiometric value for the corresponding metal oxide) on substrate material S, described above, the supporting material S can be a conductive ceramic material, selected from e.g. antimony tin oxide (ATO), fluorine doped tin oxide (FTO), indium tin oxide (ITO) or titanium oxynitride ($TiO_xN_y$). The same is also true, mutatis mutandis, for a supporting material S that is a conductive composite material.

In a specific embodiment according to the present invention, the supported noble metal-M alloy nanoparticle is a platinum-alloy electrocatalyst that is a catalyst for catalyzing an electrochemical reaction. For instance, the catalyst is a catalyst for the anode hydrogen oxidation reaction (HOR) and/or the ORR. Preferably, the catalyst is an ORR-catalyst. For instance, the catalyst is a fuel cell catalyst, i.e. a catalyst, which is employed at the anode (catalyzing HOR) or cathode (catalyzing ORR) of a fuel cell, such as a PEM fuel cell.

As synthesized (especially after thermal annealing and further enrichment with M) platinum-alloy catalysts commonly show very poor catalytic activity (e.g. for the ORR), unless they undergo a further treatment prior to usage. After synthesis a large fraction of the catalyst surface is frequently covered by the less noble metal atoms blocking accessibility of platinum active sites at the surface of the platinum-alloy. The superficial less noble metals of the platinum-alloy catalyst are therefore also frequently referred to as impurities, as they decrease the catalytic activity. Thus platinum-alloy catalysts normally require to undergo a treatment in order to remove the less noble metal from the surface of the catalyst. That is dealloying or leaching of the less noble metal from the surface of the platinum-alloy is required. In this way a platinum-alloy catalyst is achieved, which has the composition of a platinum-alloy in the inside, but the outermost atomic layer(s) of the platinum-alloy catalyst are ideally composed of platinum only, thus forming a platinum overlayer. Such a platinum overlayer is frequently referred to as a "platinum skin" or a "platinum skeleton" overlayer (having a thickness, which may range from a single atomic layer of platinum up to a thickness of about 2 nm). By removing the less noble metal from the catalyst surface, the catalytically active platinum becomes accessible and the catalytic activity is increased. Therefore the treatment may be referred to as "catalyst activation".

However, while the less noble metal of the platinum-alloy catalyst needs to be removed from the catalyst surface, it shall not be removed from the inside of the platinum-alloy catalyst. The presence of the less noble metal in the inside of the platinum-alloy alters the structural and/or electronic properties of the platinum-alloy compared to platinum only materials and thus causes effects known as ligand and/or strain effect. For instance, the ligand/strain effect, along with a better utilization of platinum, is held responsible for the improved activities of platinum-alloy catalysts compared to platinum only catalysts with respect to the ORR. Namely, the less noble metal may induce strain and therefore alter the structure of the platinum overlayer, which is important for the catalytic performance of the platinum-alloy catalyst. A complete removal of the less noble metal from the platinum-alloy thus eventually results in a decline of catalyst activity.

For instance, one of the typical methods to increase the activity of platinum-alloy catalysts used to catalyze the ORR, can be performed with the so-called electrochemical activation. A typical electrochemical activation method employed for screening of as-synthesized platinum-alloy electrocatalysts is performed using an electrochemical cell. Therefore, it is sometimes referred to as in-situ electrochemical activation (in-situ EA), as the activation is performed inside the electrochemical cell, wherein catalyst activity measurements can be performed or wherein the catalyst is utilized to catalyze the desired reaction. Such activation is different from the activation used prior to use in electrochemical conversion devices. Thus, in-situ EA is only used for the purpose of screening.

Standard laboratory electrochemical cells are usually employed, for instance three-electrode half-cell-configurations as described by Allen J. Bard and Larry R. Faulkner: "Electrochemical Methods, Fundamentals and Applications" 2001, 2nd Edition, ISBN 978-0-471-04372-0, John Wiley & Sons, Inc., Chapter 1.3.4, especially pages 24-27. In a respective electrochemical cell, the platinum-alloy catalyst is electrically contacted to an electrode, in particular a working electrode. For this purpose the so called thin-film method is usually applied. Namely, a thin film of catalyst material is deposited on the working electrode. This can be achieved by preparing a suspension of the platinum-alloy catalyst, which is thereafter dried at the surface of the working electrode. In this way a thin film of catalyst in electrical contact with the working electrode is obtained. If the catalytic activity of the catalyst is to be determined it is beneficial to use a rotating disc electrode (RDE) as a working electrode. The basic principles of RDE are for instance summarized by Allen J. Bard and Larry R. Faulkner: "Electrochemical Methods, Fundamentals and Applications" 2001, $2^{nd}$ Edition, ISBN 978-0-471-04372-0, John Wiley & Sons, Inc., Chapter 9.3. Measurements of thin films deposited on a RDE as working electrode, are referred to as thin film rotating disc measurements (TF-RDE). After bringing the platinum-alloy catalyst into electrical contact with the working electrode of the electrochemical cell, the electrochemical cell is fully assembled and the working electrode with the catalyst on top is brought into contact with a suitable electrolyte. Thereafter electrochemical activation can be performed by subjecting the catalyst to an external electric current and/or potential. That is, the catalyst can be subjected e.g. to galvanostatic, potentiostatic, potentiodynamic conditions or similar conditions. For this purpose the electrodes of the electrochemical cell can be controlled using a potentiostat, however in principle also other power sources may be used. Mostly, electrochemical activation is performed by subjecting the platinum-alloy catalyst to potentiodynamic cycling, that is cyclovoltammetry (CV). This allows to precisely control the potential window, number of potential cycles and scan rate. By subjecting the platinum-alloy catalyst to suitable electrical currents and/or potentials inside the electrochemical cell, dissolution of the less noble metal of the platinum-alloy catalyst is achieved, thus resulting into dealloying and/or leaching of the less noble metal from the surface of the platinum-alloy catalyst. For this purpose potential sweeps, as applied during cyclovoltammetry, are very effective. The dissolved less noble metal accumulates in the electrolyte. In this way, a platinum overlayer can be obtained and the activity of the catalyst for the ORR is increased.

The ORR-activity of a platinum-alloy catalyst can be expressed by means of specific activity (SA) and/or mass activity (MA). The specific activity is an activity normalized with respect to the catalyst surface area. That is, the activity is normalized with respect to the so called electrochemically active surface area (ECSA), which in case of the ORR (and/or HOR) is determined by the platinum atoms present at the surface of the platinum-alloy catalyst. The ECSA thus corresponds to the platinum-surface area of the platinum-alloy catalyst. In case the platinum-alloy catalyst comprises a carbon support, the carbon support does not contribute to the ECSA, as it does not catalyze the ORR. MA is an activity normalized with respect to the mass of platinum present in the platinum-alloy catalyst. Thus, the SA refers to the so called kinetic current for the ORR at a given potential (typically 0.9 V vs. RHE; RHE=Reversible Hydrogen Electrode) normalized by the ECSA. It is commonly expressed with the unit [mA/cm$^2$]. The MA refers to the so called kinetic current for the ORR at a given potential (typically 0.9 V vs. RHE) normalized by the mass of platinum present in the platinum-alloy catalyst. It is commonly expressed with the unit [A/mgp$_t$]. The ECSA can for instance be determined electrochemically via adsorption of a carbon monoxide monolayer on the catalyst surface (the adsorption of CO being performed at a controlled potential, e.g. at 0.05 V vs. RHE) and subsequent oxidation of the monolayer via cyclic voltammetry (so called CO electrooxidation or CO stripping experiments). The ECSA$_{CO}$ is then calculated from the charge required for the CO to be oxidized. The ECSA$_{CO}$ is commonly expressed using the unit [m$^2$/gp$_t$]. The specific activity and mass activity are linked with each other via the ECSA of the catalyst by the following equation: MA=SA•ECSA.

The meaning and determination of the SA, MA and ECSA are known to the skilled artisan.

EXAMPLES

The present invention is exemplified in following Examples 1-17 by the Pt-M alloy system, wherein M is Cu, Ni or Co, and noble metal is Pt. In the said Examples commercial carbon supports of Vulcan XC72, Ketjen Black EC300J, Printex® XE2 and Ketjen Black EC600J were used, which are all carbon black materials, with BET surface area between 250 and 1400 m$^2$/g. The Examples also includes support materials reduced graphene oxide and TiO$_x$N$_y$. The following examples should not be understood as limiting for the present invention as the noble metal Pt may be alloyed with other less noble metals, M, and the support material can be any other support material as defined above.

In the present Pt-M alloy embodiment, the strong interaction between CO (carbon monoxide) gas and Pt is used as a capping agent restricting Pt nanoparticles to grow during the GD reaction. This approach not only results in synthesis of very small and well dispersed nanoparticles, but is also very energy efficient and requires no additional steps for any surfactant removal.

Figure 2:
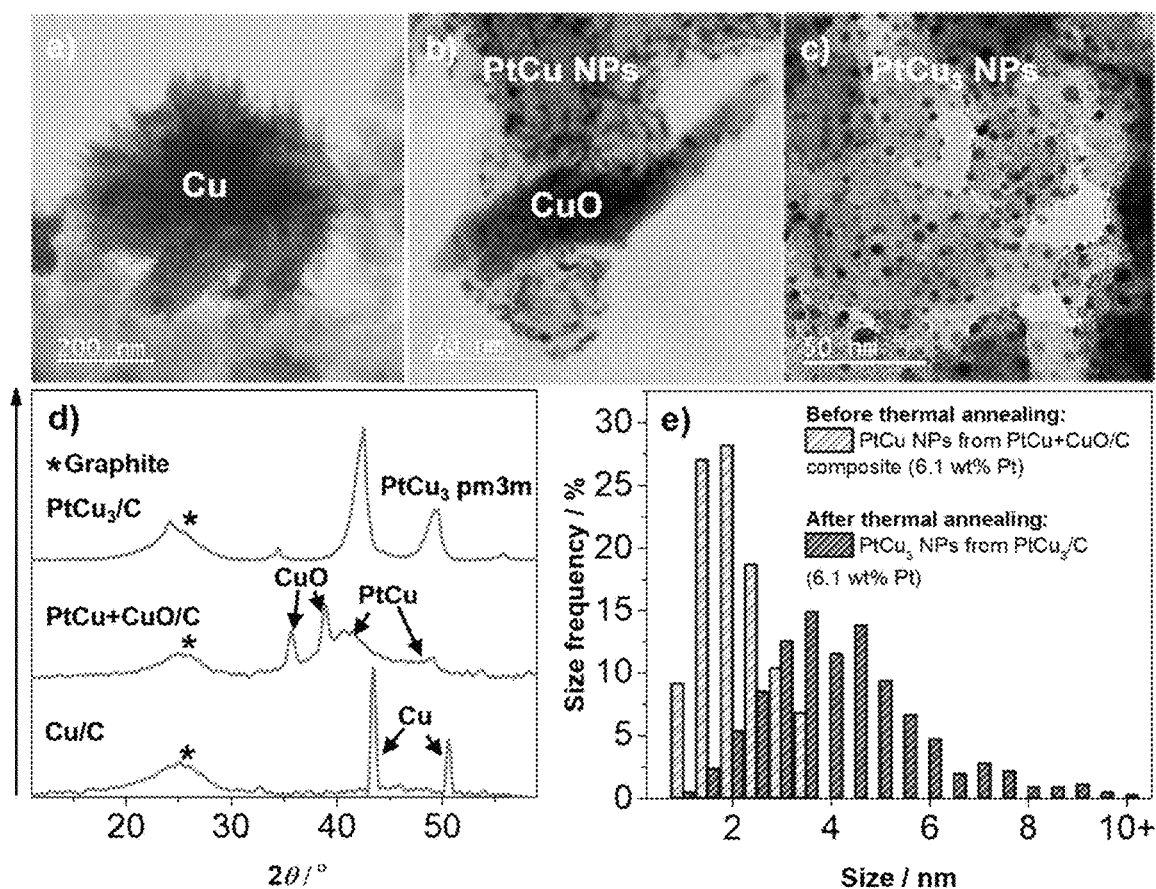
FIG. 2: Measurements of Example 2 (however a general representation of the process); a)-c) TEM analysis and d) XRD analysis of the main synthesis steps for production of $PtCu_3$/C (GD synthesis in presence of CO); and e) size distribution of PtCu nanoparticles from PtCu+CuO/C composite before thermal annealing and of $PtCu_3$/C after thermal annealing (GD synthesis in presence of CO).

In the Pt—Cu alloy system, the present new synthesis involves three main steps: (i) preparation of Cu crystal phase and/or partially oxidized (ex-situ) copper oxide, CuO crystal phase, on a carbon support, herein generally denoted Cu+CuO/C. The Cu on the carbon support as the sacrificial metal does not need to be in the form of nanoparticles, but may be in the nm size to micron size, as shown in FIG. 2a; (ii) the GD reaction of passivated (in-situ and optionally ex-situ) CuO/C (y being >0 to a stoichiometric copper oxide value) with a soluble Pt-salt precursor in a liquid (e.g. water based) in order to obtain a PtCu+CuO/C composite, see FIG. 2b); and (iii) the subsequent thermal annealing in inert/reducing atmosphere to alloy the remaining Cu (now in the form of CuO that gets thermally reduced) for further enrichment of the Pt-alloy nanoparticles, see FIG. 2c). Further, in FIG. 2d), it is shown XRD analysis (XRD=X-ray diffraction pattern) of the precursor Cu on carbon support (lowest) showing relatively narrow and high peaks for the Cu, i.e. indicating relatively large crystallite size of the Cu, according to the Scherrer equation which discusses the relation between XRD peak and crystallite size. The middle XRD analysis shows the GD product before thermal annealing, where CuO phases are clearly identified together with PtCu alloy phases, the peaks for the PtCu alloy are low and broad which indicates very small crystallite size. The top XRD analysis shows the resulting material after thermal annealing consisting of PtCu$_3$ alloy. The broadening of the peaks indicating a very small particle size. FIG. 2e) shows change in particle size distribution before and after thermal annealing, showing a relatively narrow particle size distribution.

The same double passivation GD synthesis method have also extrapolated to gram scale synthesis using Ni/C and Co/C instead of Cu/C. While GD of Cu/C was able to efficiently occur in ultrapure water, the pH was adjusted with a very low concentration of KOH for the passivation of Ni and Co due to the differences in the Pourbaix diagrams of each sacrificial metal, respectively. This has shown that the double passivation GD method can be used for a wide variety of systems, while one should always consider i) the Pourbaix diagram of the sacrificial metal supported on the substrate which in turn dictates the required pH and ii) the differences in formation, growth and properties of its oxide.

Examples 18-19 relates to a synthesis of supported Pd nanoparticles and CuO nanoparticles composite wherein CO gas and hydrogen gas are used as adsorptive gas.

The powder X-ray diffraction (XRD) measurements of all samples were carried out on either PANalytical X'Pert PRO MPD diffractometer with Cu Kα1 radiation (λ=1.5406 Å) in the 2θ range from 10° to 60° with the 0.034° step per 100 s using full opened X'Celerator detector or with Siemens D5000 diffractometer with Cu Kα1 radiation (λ=1.5406 Å) in the 2θ range from 10° to 60° with the 0.04° step per 1 s. Samples were prepared on zero-background Si holder.

TEM analysis was carried out in a probe Cs-corrected scanning transmission electron microscope Jeol ARM 200 CF equipped with an SDD Jeol Centuria Energy-dispersive X-ray (EDX) spectrometer. The operational voltage was set to 80 kV. High Angle Annular Dark Field (HAADF) images were taken with 68 and 180 mrad for inner and outer semiangles. Convergence angle was set to 25 mrads.

Analysis of Particle Size distribution: Software used was Image J with which the particle size can either be measured manually or by an algorithm, depending on the distribution or if the particles are overlapping or not. If they are overlapping, they are measured manually, later the data is grouped and arranged as a histogram on Microsoft Excel, and later plotted in OriginLab.

When referring to SA, MA and ECSA in the present application, the respective values are determined experimentally via thin film rotating disc electrode measurements (TF-RDE), as described in the general part of the description. A detailed explanation of the experimental determination of SA, MA and ECSA is provided at least by Mayrhofer et al., "Measurement of Oxygen Reduction Activities via Rotating Disc Electrode Method: From Pt Model Surfaces to Carbon-Supported High Surface Area Catalysts." Electrochimica Acta 2008, 53, 3181-3188; and by Schmidt et al., "Characterization of High-Surface Area Electrocatalysts Using a Rotating Disk Electrode Configuration" J. Electrochem. Soc. 1998, 145, 2354-2359.

These articles define a standard when it comes to the determination of catalytic activity of electrocatalysts for the ORR. The determination of HOR activities can also be performed applying TF-RDE measurements. All measurements of the SA, MA and ECSA given in this application are performed according to the standards as described in said articles. The description of the methods of determination of SA, MA and ECSA of said articles are incorporated herein, by reference.

Test: Passivation of M Precursors

Tests proving the formation of in-situ formed passivating oxide layer on metal M precursor on supporting particles. Tests were performed for Cu and Co on carbon support particles.

Test 1: Passivation of Cu/C with Co Purging.

1 grams of Cu/C (C: carbon black with a BET surface area of 250 m$^2$/g) with 14.1 wt % Cu was suspended in 100 mL of ultrapure water (Milli-Q—18.2 MΩ cm) in a two neck round-bottom flask. The suspension was placed on an ultrasound bath (Ultrasound bath Iskra Sonis 4) for 3 minutes (degassing). Afterwards, the suspension was first purged with Ar for 45 minutes and then switched to CO for 75 minutes. Afterwards, the suspension was filtered. The obtained Cu+CuO+Cu$_2$O/C composite was left to dry at 50° C. overnight.

Test 2: Passivation of Cu/C with Ar Purging.

1 grams of Cu/C (C: carbon black with a BET surface area of 250 m$^2$/g) with 14.1 wt % Cu was suspended in 100 mL of ultrapure water in a two neck round-bottom flask. The suspension was placed on an ultrasound bath (Ultrasound bath Iskra Sonis 4) for 3 minutes (degassing). Afterwards, the suspension was first purged with Ar for 120 minutes. Afterwards, the suspension was filtered. The obtained Cu+CuO+Cu$_2$O/C composite was left to dry at 50° C. overnight.

FIG. 3a) shows the XRD spectra of as prepared Cu/C precursor and after being suspended in water+purged with CO (Test 1) and after being suspended in water+purged only with Ar (Test 2). Formation of Cu oxide is clearly seen in both tests; the peaks for metallic Cu decreases while the Cu oxide phases increases. It is seen that there is actually less Cu phase and more oxide phase when carbon monoxide was introduced which makes sense with Pourbaix diagrams. pH was kept constant, but the (open circuit) potential was increased with (in contrast to an inert gas such as Ar) a more oxidizing gas such as CO and the conditions were further shifted into the region where passivation is promoted.

Test 3: Passivation of Co/C with Co Purging.

1 gram of Co/C (C: carbon black with a BET surface area of 250 m$^2$/g) with 14.1 wt % Co was suspended in 100 mL of ultrapure water in a two neck round-bottom flask. The suspension was placed on an ultrasound bath (Ultrasound bath Iskra Sonis 4) for 3 minutes (degassing). Afterwards, the suspension was first purged with Ar for 45 minutes and then switched to CO for 75 minutes. Afterwards, the suspension was filtered. The obtained Co+Co$_3$O$_4$/C composite was left to dry at 50° C. overnight.

Test 4: Passivation of Co/C with Co Purging, pH Adjustment.

1 gram of Co/C (C: carbon black with a BET surface area of 250 m$^2$/g) with 14.1 wt % Co was suspended in 100 mL of 0.001 M KOH (Merck) in a two neck round-bottom flask. The suspension was placed on an ultrasound bath (Ultrasound bath Iskra Sonis 4) for 3 minutes (degassing). Afterwards, the suspension was first purged with Ar for 45 minutes and then switched to CO for 75 minutes. Afterwards, the suspension was filtered and redispersed in fresh ultrapure water. After 15 minutes of mixing, the suspension was once again filtered and the process was repeated in total 3 times for neutralization of KOH. The obtained Co+Co$_3$O$_4$/C composite was left to dry at 50° C. overnight.

FIG. 3b) shows the XRD spectra of as prepared Co/C precursor and after being suspended in water+purged with CO (Test 3) and after being suspended in 0.001 M KOH+ purged with CO (Test 4). Formation of Co oxide is clearly seen in both tests; the peaks for metallic Co decreases while the Co oxide phases increases. It is further observed some Co oxide is formed in water, however at a basic pH the formation of Co oxide phase increased.

Example 1

1-6 grams of Cu/C (C carbon black with a BET surface area of 250 m$^2$/g) with 25.5 wt % Cu was suspended in 100 mL (200 mL for 6 grams batch) of ultrapure water in a two neck round-bottom flask. The suspension was placed on an ultrasound bath (Ultrasound bath Iskra Sonis 4) for 3 minutes for degassing. Afterwards, the suspension was purged with Ar for 45 minutes. The suspension was then bubbled with CO gas for 15 minutes while stirring with a magnetic stirrer at 900 rpm to achieve saturation. After 15 minutes of bubbling with CO (g), 11 mL of 0.1 M K$_2$PtCl$_4$ (Apollo scientific) per gram of Cu/C was added with a syringe pump (WPI sp100i, flow 160 mL/h) continuously while purging the reaction mixture with CO (g). After entire Pt precursor was added to the reaction mixture, the suspension was filtered and redispersed in fresh ultrapure water. After 15 minutes of mixing, the suspension was once again filtered and the process was repeated in total 3 times. After the last filtration, the obtained PtCu+CuO/C electrocatalysts were left to dry at 50° C. overnight. Dry PtCu+CuO/C electrocatalyst powder as synthesized in presence of CO was placed in a Al$_2$O$_3$ crucible. The crucible was placed into a quartz tube that was sealed and purged with Ar for 2 hours. After 2 hours (when the atmosphere in the quartz tube was oxygen free), the temperature was raised to 800° C. with a ramp of 10 K/min while continuously purging with Ar for the entire duration of the thermal annealing process. After 1 hour at 800° C., the temperature was cooled to room temperature with a ramp of 10 K/min and the PtCu$_3$/C electrocatalyst with 20 wt % Pt and 18.8 wt % Cu was collected.

Example 2

2 grams of Cu/C (C: carbon black with a BET surface area of 250 m$^2$/g) with 9.3 wt % Cu was suspended in 250 mL of ultrapure water in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 3.3 mL of 0.1 M K$_2$PtCl$_4$ (Apollo scientific) per gram of Cu/C was added with a syringe pump (WPI sp100i, flow 160 mL/h) continuously while purging the reaction mixture with CO. The rest of the synthesis was the same as in the case of Example 1. PtCu$_3$/C electrocatalyst with 6.1 wt % Pt and 8.6 wt % Cu was collected at the end.

Example 3

2 grams of Cu/C (C: carbon black with a BET surface area of 250 m$^2$/g) with 9.3 wt % Cu was suspended in 100 mL of ultrapure water in a two neck round-bottom flask. The suspension was placed on an ultrasound bath (Ultrasound bath Iskra Sonis 4) for 3 minutes (degassing). Afterwards, the suspension was purged with Ar for 15 minutes while stirring with a magnetic stirrer at 900 rpm to achieve saturation. After 15 minutes of bubbling with Ar, 3.3 mL of 0.1 M $K_2PtCl_4$ (Apollo scientific) per gram of Cu/C was added with a syringe pump (WPI sp100i, flow 160 mL/h) continuously while purging the reaction mixture with Ar. The rest of the synthesis was the same as in the case of Example 1.

Example 4

1 gram of Cu/C (C: carbon black with a BET surface area of 250 m²/g) with 14.1 wt % Cu was suspended in 100 mL of ultrapure water in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 5 mL of 0.1 M $K_2PtCl_4$ (Apollo scientific) was added with a syringe pump (WPI sp100i, flow 160 mL/h) continuously while purging the reaction mixture with CO. Everything else same as Example 1. $PtCu_3$/C electrocatalyst with 11.6 wt % Pt and 11.7 wt % Cu was collected at the end.

Example 5

1 gram of Cu/C (C: carbon black with a BET surface area of 250 m²/g) with 14.1 wt % Cu was suspended in 100 mL of ultrapure water in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 10 mL 0.1 M $K_2PtCl_4$ was added with a syringe pump (WPI sp100i, flow 160 mL/h) continuously while purging the reaction mixture with CO. Everything else same as Example 1. PtCu/C electrocatalyst with 19.5 wt % Pt and 7.3 wt % Cu was collected at the end.

Example 6

1 gram of Cu/C (C: carbon black with a BET surface area of 250 m²/g) with 14.1 wt % Cu was suspended in 100 mL of ultrapure water in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 12.5 mL of 0.1 M $K_2PtCl_4$ was added with a syringe pump (WPI sp100i, flow 160 mL/h) continuously while purging the reaction mixture with CO. Everything else same as Example 1. PtCu/C electrocatalyst with 24 wt % Pt and 5.5 wt % Cu was collected at the end.

Example 7

1 gram of Cu/C (C: carbon black with a BET surface area of 250 m²/g) with 14.1 wt % Cu was suspended in 100 mL of ultrapure water in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 15 mL of 0.1 M $K_2PtCl_4$ (Apollo scientific) was added with a syringe pump (WPI sp100i, flow 160 mL/h) continuously while purging the reaction mixture with CO. Everything else same as Example 1. PtCu/C electrocatalyst with 26 wt % Pt and 4.1 wt % Cu was collected at the end.

Example 8

1-3 grams of Cu/C (C: carbon black with a BET surface area of 250 m²/g) with 33 wt % Cu was suspended in 100 mL of ultrapure water in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 15 mL of 0.1 M $K_2PtCl_4$ (Apollo scientific) per gram of Cu/C was added with a syringe pump (WPI sp100i, flow 160 mL/h) continuously while purging the reaction mixture with CO. Everything else same as Example 1. $PtCu_3$/C electrocatalyst with 26.8 wt % Pt and 25.2 wt % Cu was collected at the end.

Example 9

1-6 grams of Cu/C (C: carbon black with a BET surface area of 800 m²/g) with 33 wt % Cu was suspended in 100 mL (200 mL for 6 grams batch) of ultrapure water in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 15 mL (per gram of Cu/C) of 0.1 M $K_2PtCl_4$ (Apollo scientific) was added with a syringe pump (WPI sp100i, flow 160 mL/h) continuously while purging the reaction mixture with CO. Everything else same as Example 1. $PtCu_3$/C electrocatalyst with 26.4 wt % Pt and 25.9 wt % Cu was collected at the end.

Example 10

1-3 grams of Cu/C (C: carbon black with a BET surface area of 1000 m²/g) with 33 wt % Cu was suspended in 100 mL of ultrapure water in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 15 mL (per gram of Cu/C) of 0.1 M $K_2PtCl_4$ (Apollo scientific) was added with a syringe pump (WPI sp100i, flow 160 mL/h) continuously while purging the reaction mixture with CO. Everything else same as Example 1. $PtCu_3$/C electrocatalyst with 25.5 wt % Pt and 26 wt % Cu was collected at the end.

Example 11

1 gram of Cu/C (C: carbon black with a BET surface area of 1400 m²/g) with 33 wt % Cu was suspended in 100 mL of ultrapure water in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 15 mL of 0.1 M $K_2PtCl_4$ (Apollo scientific) was added with a syringe pump (WPI sp100i, flow 160 mL/h) continuously while purging the reaction mixture with CO. Everything else same as Example 1. $PtCu_3$/C electrocatalyst with 26 wt % Pt and 25.6 wt % Cu was collected at the end.

TABLE 1

TF-RDE evaluation of four $PtCu_3/C$ electrocatalysts supported on the same type of carbon support (carbon black with a BET surface area of 250 $m^2/g$) but varying metal loading (Pt + Cu) after 200 cycles of in-situ EA (0.05-1.2 V vs. RHE, 300 mV/s).

| Sample | Carbon type | Carbon B.E.T. [$m^2/g$] | $m_{e\text{-}cat}$ on RDE [µg] | Pt [wt %] | Cu [wt %] | CO stripping area [$cm^2$] | $ECSA_{co}$ [$m^2/g_{Pt}$] | SA @ 0.9 V [$mA/cm^2$] | MA @ 0.9 V [$A/mg_{Pt}$] |
|---|---|---|---|---|---|---|---|---|---|
| $PtCu_3/C$-CO (Example 2) | Vulcan XC-72 | 250 | 20 | 6.1 | 8.6 | 1.13 | 93.1 | 2.7 | 2.5 |
| $PtCu_3/C$ (Example 4) | Vulcan XC-72 | 250 | 20 | 11.6 | 11.7 | 1.3 | 56.2 | 2.7 | 1.51 |
| $PtCu_3/C$ (Example 1) | Vulcan XC-72 | 250 | 20 | 20 | 18.8 | 1.98 | 49.6 | 2.4 | 1.22 |
| $PtCu_3/C$ (Example 8) | Vulcan XC-72 | 250 | 20 | 26.8 | 25.2 | 2.32 | 43.4 | 2.2 | 0.95 |

TABLE 2

TF-RDE evaluation of four $PtCu_3/C$ electrocatalysts supported on the same type of carbon support (carbon black with a BET surface area of 250 $m^2/g$) but varying Pt:Cu chemical composition after 200 cycles of in-situ EA (0.05-1.2 V vs. RHE, 300 mV/s).

| Sample | Carbon type | Carbon B.E.T. [$m^2/g$] | $m_{e\text{-}cat}$ on RDE [µg] | Pt [wt %] | Cu [wt %] | CO stripping area [$cm^2$] | $ECSA_{co}$ [$m^2/g_{Pt}$] | SA @ 0.9 V [$mA/cm^2$] | MA @ 0.9 V [$A/mg_{Pt}$] |
|---|---|---|---|---|---|---|---|---|---|
| $PtCu_3/C$ (Example 4) | Vulcan XC-72 | 250 | 20 | 11.6 | 11.7 | 1.3 | 56.2 | 2.7 | 1.51 |
| PtCu/C (Example 5) | Vulcan XC-72 | 250 | 20 | 19.5 | 7.3 | 1.87 | 47.9 | 1.1 | 0.54 |
| PtCu/C (Example 6) | Vulcan XC-72 | 250 | 20 | 24 | 5.5 | 1.71 | 35.6 | 1 | 0.36 |
| PtCu/C (Example 7) | Vulcan XC-72 | 250 | 20 | 26 | 4.1 | 1.77 | 34 | 0.8 | 0.27 |

TABLE 3

TF-RDE evaluation of four $PtCu_3/C$ electrocatalysts supported on different types of commercially available carbon supports after 200 cycles of in-situ EA (0.05-1.2 V vs. RHE, 300 mV/s).

| Sample | Carbon type | Carbon B.E.T. [$m^2/g$] | $m_{e\text{-}cat}$ on RDE [µg] | Pt [wt %] | Cu [wt %] | CO stripping area [$cm^2$] | $ECSA_{co}$ [$m^2/g_{Pt}$] | SA @ 0.9 V [$mA/cm^2$] | MA @ 0.9 V [$A/mg_{Pt}$] |
|---|---|---|---|---|---|---|---|---|---|
| $PtCu_3/C$ (Example 8) | Vulcan XC-72 | 250 | 20 | 26.8 | 25.2 | 2.32 | 43.4 | 2.2 | 0.95 |
| $PtCu_3/C$ (Example 9) | Ketjen Black EC300J | 800 | 20 | 26.4 | 25.9 | 2.35 | 48.6 | 2.9 | 1.23 |
| $PtCu_3/C$ (Example 10) | Printex ® XE2 | 1000 | 20 | 25.5 | 26 | 3.27 | 64 | 2.5 | 1.61 |
| $PtCu_3/C$ (Example 11) | Ketjen Black EC600J | 1400 | 20 | 26 | 25.6 | 2.59 | 62 | 2.5 | 1.58 |

Figure 4:
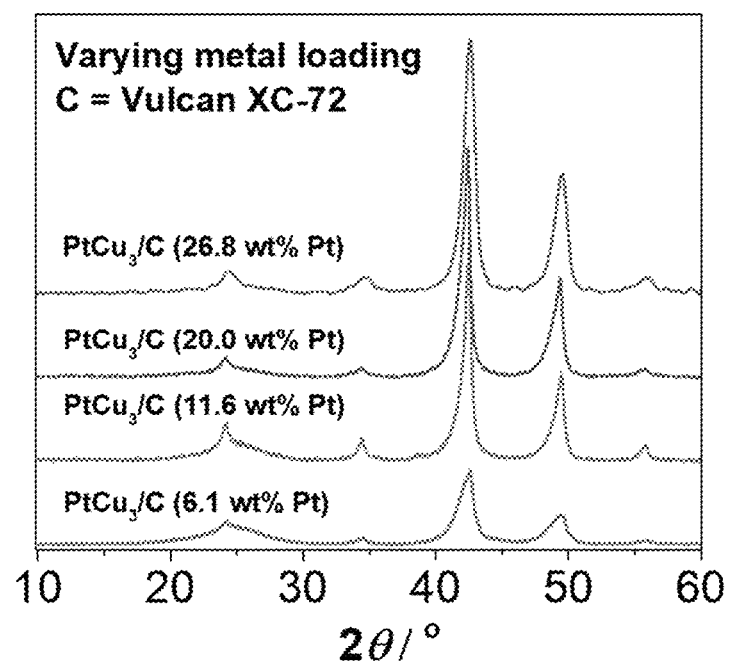
FIG. 4: XRD of various $PtCu_3$/C electrocatalyst (Examples 1, 2, 4, 8) with similar Pt:Cu chemical composition, shows variations in total metal loading (Pt+Cu) by using Cu/C precursors with different Cu loadings on the same carbon support.
Figure 5:
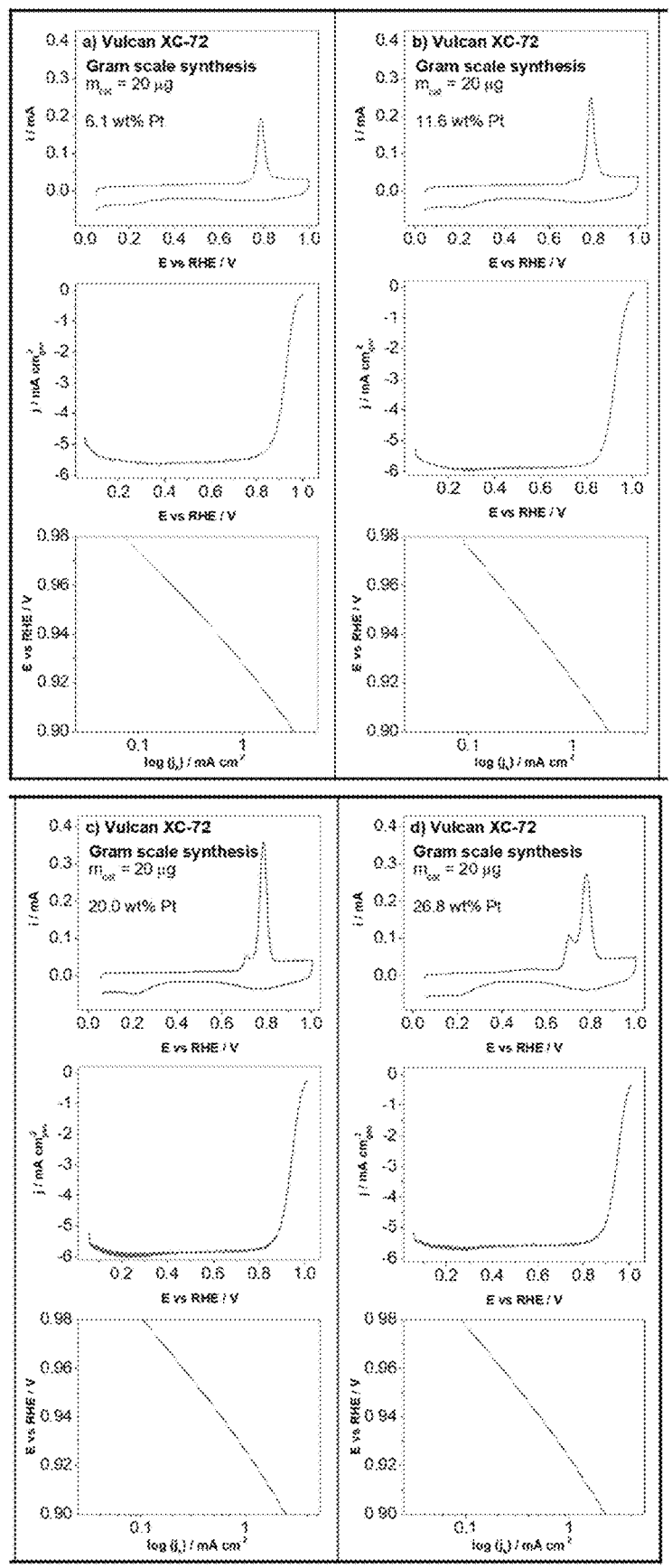
FIG. 5: CO stripping CVs (0.1 M $HClO_4$, Ar saturated, no rotation, 20 mV/s), ORR polarization curves (0.1 M $HClO_4$, $O_2$ saturated, ohmic resistance compensated, background current subtracted, 1600 rpm, 20 mV/s) as well as calculated Tafel plots of $PtCu_3$/C electrocatalysts (Examples 1, 2, 4, 8) after 200 cycles of in-situ EA (0.05-1.2 V vs. RHE, 300 mV/s). SA, and MA measured at 0.9 V vs. RHE as well as $ECSA_{CO}$ is available in Table 1.

FIG. 4 shows XRD spectra of products with variation of total metal loading (Pt+Cu) by using Cu/C precursors with different Cu loadings on the same carbon support (Examples 1, 2, 4 and 8). This set of analogues (ref. Table 1) and FIG. 5 shows CO stripping CVs, ORR polarization curves as well as calculated Tafel plots of $PtCu_3/C$ electrocatalysts (Examples 1, 2, 4 and 8) after in-situ EA. While the $ECSA_{CO}$ (surface area of platinum normalized by the mass of platinum) and thus also MA are getting lower by the increase of total metal loading (Pt+Cu), the area corresponding to the CO stripping area (surface area of platinum per mass of the catalyst) is actually increasing. Furthermore, this set of analogues shows the flexibility in the design of different total metal loadings (Pt+M), which is very important for the application in a PEMFC, where high metal loadings are needed, while at the same time having an $ECSA_{CO}$ of minimum above 40 $m^2$/gpt. All four electrocatalysts also highly exceed state-of-the-art Pt/C electrocatalysts in terms of SA and MA.

Figure 6:
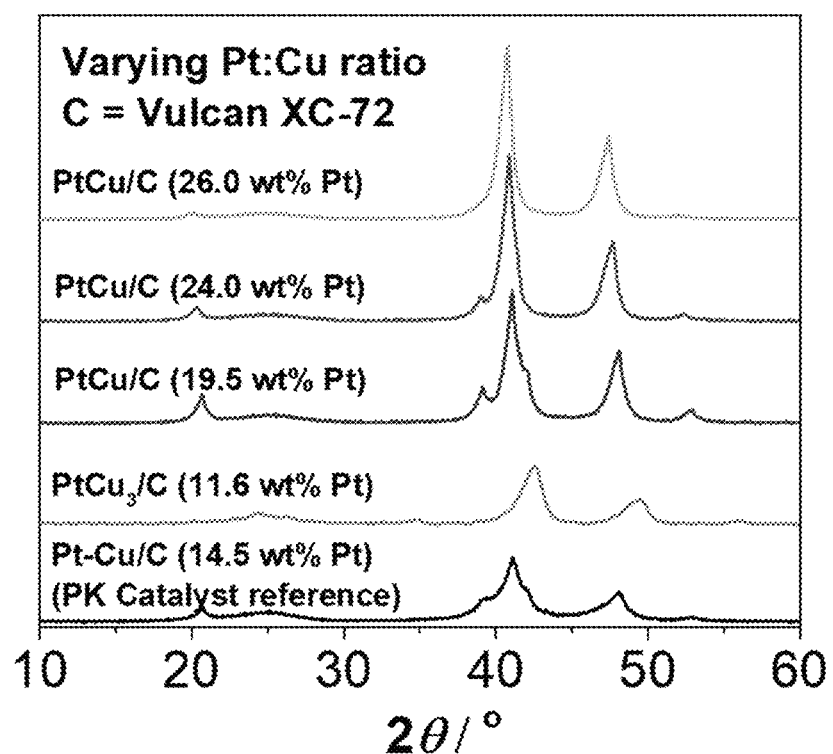
FIG. 6: XRD of various Pt—Cu/C electrocatalyst (Examples 4-7), shows variations in Pt:Cu chemical composition where a different amount of Pt precursor was added to the same Cu/C precursor.
Figure 7:
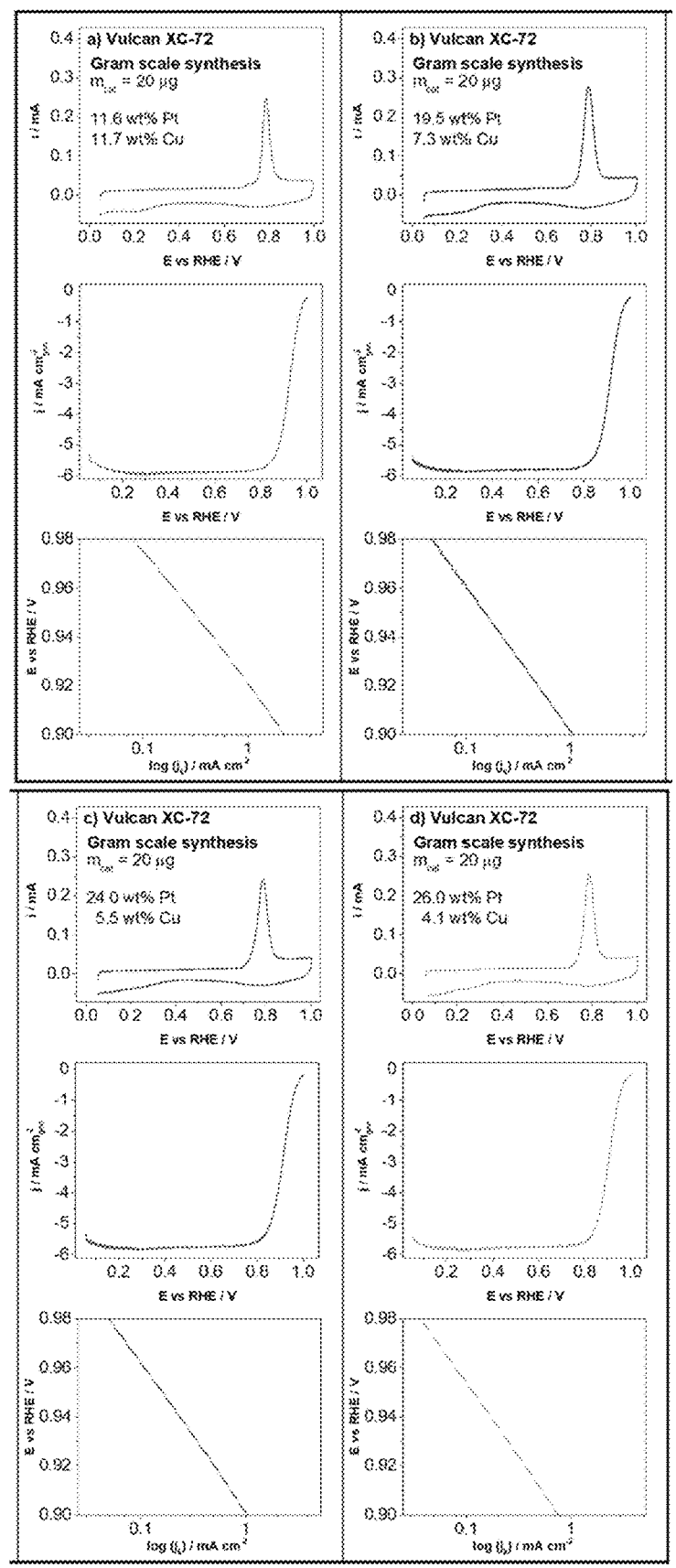
FIG. 7: CO stripping CVs (0.1 M $HClO_4$, Ar saturated, no rotation, 20 mV/s), ORR polarization curves (0.1 M $HClO_4$, $O_2$ saturated, ohmic resistance compensated, background current subtracted, 1600 rpm, 20 mV/s) as well as calculated Tafel plots of Pt—Cu/C (Examples 4-7) electrocatalysts after 200 cycles of in-situ EA (0.05-1.2 V vs. RHE, 300 mV/s). Pt:Cu chemical composition was varied from less Pt rich to more Pt rich in the order (a) Example 4<(b) Example 5<(c) Example 6<(d) Example 7. SA, and MA measured at 0.9 V vs. RHE as well as $ECSA_{CO}$ is available in Table 2.

FIG. 6 shows XRD spectra of products with variation in Pt:Cu chemical composition where a different amount of $K_2PtCl_4$ precursor was added to the fixed Cu loading on the Cu/C precursor (Examples 4-7). For the reference, a commercial Pt—Cu/C electrocatalyst (PK Catalyst) was analyzed, which showed a very similar XRD pattern to the PtCu/C electrocatalyst from Example 5. This set of analogues shows that the "double passivation" GD method is not limited by the $PtM_3$ crystal structure, but rather with the amount of the sacrificial metal (M). FIG. 7 shows CO stripping CVs, ORR polarization curves as well as calculated Tafel plots of Pt—Cu/C electrocatalysts (Examples 4-7) after in-situ EA. The results nicely show that a more Pt-rich chemical composition (ref. Table 2 and FIG. 7) exhibits lower SA at 0.9 V vs. RHE for ORR in the order of Example 4>Example 5>Example 6>Example 7. Nevertheless, all presented Pt—Cu/C electrocatalysts exhibit enhanced SA in contrast to the state-of-the-art Pt/C electrocatalysts. All Pt—Cu/C electrocatalysts also exhibit sufficient $ECSA_{CO}$ (above 40 m$^2$/gpt) and thus also exceed state-of-the-art Pt/C electrocatalysts in terms of MA.

Figure 8:
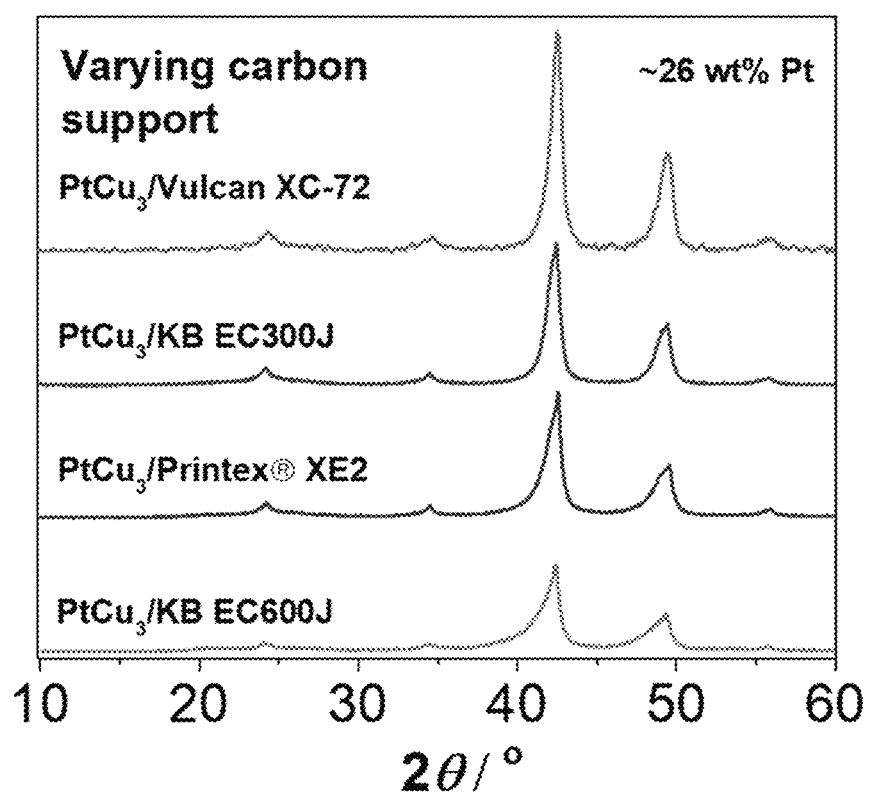
FIG. 8: XRD of various $PtCu_3$/C electrocatalyst (Examples 8-11), shows variations in carbon support where higher surface area (BET) of the carbon support resulted in better dispersion of a similar total metal loading (Pt+Cu) with a similar Pt:Cu chemical composition.
Figure 9:
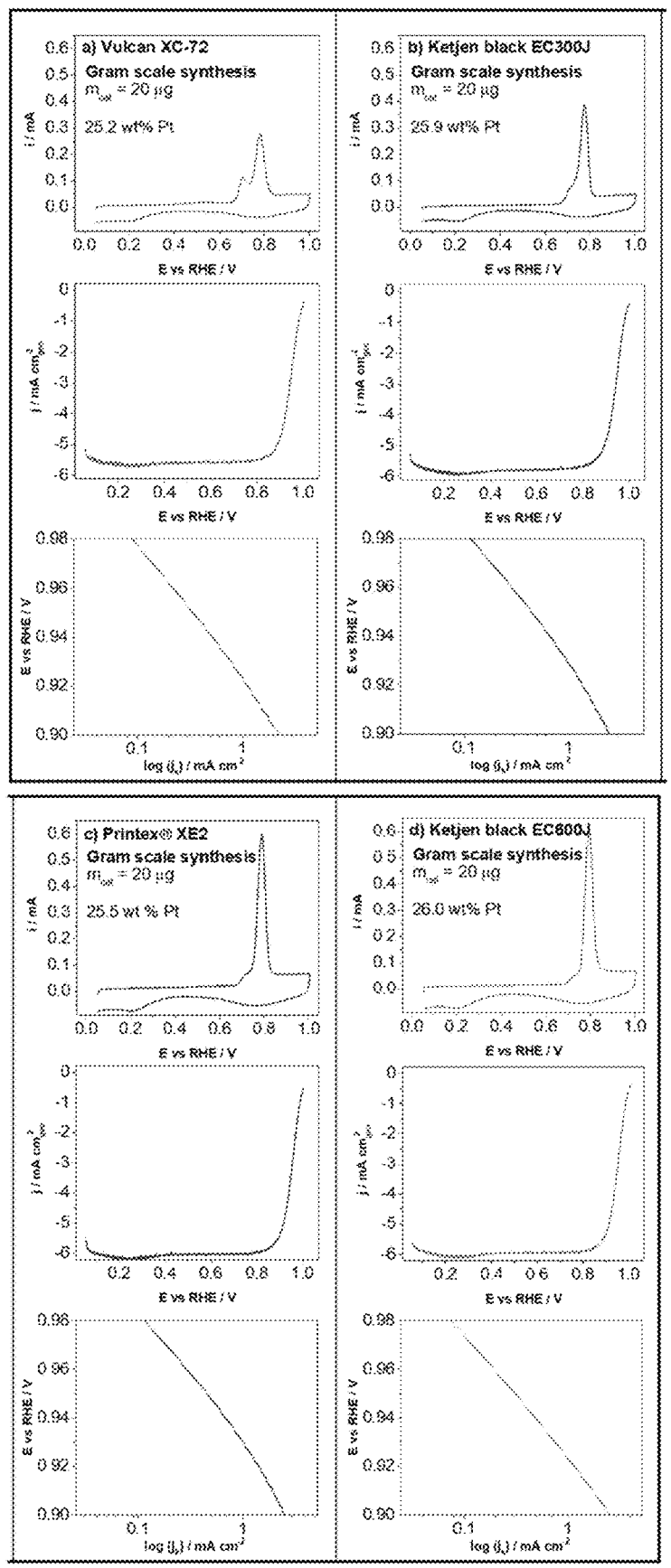
FIG. 9: CO stripping CVs (0.1 M $HClO_4$, Ar saturated, no rotation, 20 mV/s), ORR polarization curves (0.1 M $HClO_4$, $O_2$ saturated, ohmic resistance compensated, background current subtracted, 1600 rpm, 20 mV/s) as well as calculated Tafel plots of $PtCu_3$/C electrocatalysts (Examples 8-11) after 200 cycles of in-situ EA (0.05-1.2 V vs. RHE, 300 mV/s). Total metal loading (Pt+Cu) as well as Pt:Cu chemical composition were kept as constant as possible, while the type of carbon support was varied with (a) being carbon black with BET of 250 $m^2$/g (Example 8), (b) being carbon black with a BET of 800 $m^2$/g (Example 9), (c) being carbon black with a BET of 1000 $m^2$/g (Example 10) and (d) being carbon black with a BET of 1400 $m^2$/g (Example 11). SA, and MA measured at 0.9 V vs. RHE as well as $ECSA_{CO}$ is available in Table 3.

FIG. 8 shows XRD spectra of products with similar total metal loading (Pt+Cu) and Pt:Cu chemical composition, but variation in the carbon support where the examples used carbon supports with BET between 250 and 1400 m$^2$/g (Examples 8-11). This set of analogues (ref. Table 3) in FIG. 9 shows CO stripping CVs, ORR polarization curves as well as calculated Tafel plots of the corresponding PtCu$_3$/C electrocatalysts (Examples 8-11) after in-situ EA. An increasing trend in $ECSA_{CO}$ and CO stripping area was observed with higher BET area of carbon support. Thus, according to the examples higher carbon support BET resulted in better dispersion of noble metal alloy nanoparticles of the similar total metal loading (Pt+Cu) (Examples 8-11). This is a good strategy how to increase $ECSA_{CO}$ and CO stripping area while not sacrificing the total metal loading (Pt+Cu) as in the case of Examples 1, 2, 4 and 8. All four electrocatalysts also highly exceed state-of-the-art Pt/C electrocatalysts in terms of SA and MA.

While spontaneous GD reaction took place regardless of the presence or absence of CO at the time of Pt-salt precursor addition, there was a profound difference in the obtained PtCu+CuO/C composite (FIG. 10), ref. Example 3. As visible from the overlap of peaks in FIG. 10a, performing the reaction in the presence of CO has no effect on the obtained CuO phase (35.7° (−111) and 38.9° (111) 2θ). On the other hand, there is a subtle but significant difference in the most intense peaks corresponding to the PtCu phase (41.2° (111) and 47.9° (200) 2θ). The obtained difference is a direct consequence of a strong Pt—CO interaction where CO acts as a very efficient capping agent, preventing excessive agglomeration and growth of the formed nanoparticles by passivating the Pt surface. After the subsequent thermal annealing of both analogues (FIG. 10b), the difference in obtained XRD spectra for Pm3m PtCu$_3$ phase (24.1° (100), 34.3° (110), 42.4° (111) and 49.3° (200) 2θ) of both analogues becomes even more expressed, indicating a much smaller crystallite size in the case of PtCu$_3$/C—CO. To further confirm the observed differences in XRD spectra from FIG. 10a) and b), additional ex-situ TEM analysis was performed (FIG. 10c)-f). Before thermal annealing (FIG. 10c) in the case of PtCu+CuO/C analogue, large agglomerates comprised of small PtCu nanocrystallites are observed. The observed small, but agglomerated PtCu nanocrystallites are consistent with the XRD spectra where the peaks corresponding to the PtCu phase are still rather broad. By contrast, in the case of PtCu+CuO/C—CO analogue (FIG. 10d), we observe a near-perfect dispersion of PtCu nanoparticles instead. After the subsequent thermal annealing, poorly dispersed and agglomerated PtCu nanocrystallites sinter into large spherical particles (FIG. 10e). By contrast, optimally dispersed PtCu particles remained small and well dispersed also after the thermal treatment (FIG. 10f). This comparison reveals the crucial role of the quality of initial dispersion (absence of severe agglomeration) in the prevention of excessive particle growth during thermal treatment even at temperatures as high as 800° C. Such quality of initial dispersion is intrinsically possible only in the case of double passivation (with two out of three paths for electrons blocked), while as shown in this example, absence of second passivation results in severe agglomeration (with only one out of three paths for electrons blocked). The difference in the Pt surface area can be further evaluated via "CO stripping" experiments in 0.1 M HClO$_4$ by comparing both PtCu$_3$/C (Example 3) and PtCu$_3$/C—CO (Example 2) analogues. $ECSA_{CO}$ based on the "CO stripping" experiments was measured after 200 cycles of electrochemical cycling activation (0.05-1.2 V vs. RHE, 300 mV/s), FIG. 10 g) and h). The PtCu$_3$/C—CO analogues perform significantly better than the analogue synthesized without CO gas by having over twice the $ECSA_{CO}$.

Example 12

1 gram of Ni/C (C: carbon black with a BET surface area of 250 m$^2$/g) with 14.1 wt % Ni was suspended in 100 mL of 0.0001 M KOH (Merck) in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 5 mL of 0.1 M K$_2$PtCl$_4$ (Apollo scientific) was added with a syringe pump (WPI sp100i, flow 160 mL/h) continuously while purging the reaction mixture with CO. Everything else same as Example 1. PtNi$_3$/C electrocatalyst was collected at the end.

Example 13

1 gram of Ni/C (C: carbon black with a BET surface area of 250 m$^2$/g) with 14.1 wt % Ni was suspended in 100 mL of 0.0001 M KOH (Merck) in a two neck round-bottom flask. The suspension was placed on an ultrasound bath (Ultrasound bath Iskra Sonis 4) for 3 minutes (degassing). Afterwards, the suspension was purged with Ar for 15 minutes while stirring with a magnetic stirrer at 900 rpm to achieve saturation. After 15 minutes of bubbling with Ar, 5 mL of 0.1 M K$_2$PtCl$_4$ (Apollo scientific) was added with a syringe pump (WPI sp100i, flow 160 mL/h) continuously while purging the reaction mixture with Ar. Everything else same as Example 1. Pt$_3$Ni+PtNi$_3$+Ni/C electrocatalyst was collected at the end.

Example 14

1 gram of Co/C (C: carbon black with a BET surface area of 250 m$^2$/g) with 14.1 wt % Co was suspended in 100 mL of 0.001 M KOH (Merck) in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 5 mL of 0.1 M K$_2$PtCl$_4$ (Apollo scientific) was added with a syringe pump (WPI sp100i, flow 160 mL/h) continuously while purging the reaction mixture with CO. Everything else same as Example 1. PtCo$_3$/C electrocatalyst was collected at the end.

Example 15

1 gram of Co/C (C: carbon black with a BET surface area of 250 m$^2$/g) with 14.1 wt % Co was suspended in 100 mL of 0.001 M KOH (Merck) in a two neck round-bottom flask. The suspension was placed on an ultrasound bath (Ultrasound bath Iskra Sonis 4) for 3 minutes (degassing). Afterwards, the suspension was purged with Ar for 15 minutes while stirring with a magnetic stirrer at 900 rpm to achieve saturation. After 15 minutes of bubbling with Ar, 5 mL of 0.1 M K$_2$PtCl$_4$ (Apollo scientific) was added with a syringe pump (WPI sp100i, flow 160 mL/h) continuously while purging the reaction mixture with Ar. Everything else same as Example 1. Pt$_3$Co+PtCo$_3$+Co/C electrocatalyst was collected at the end.

Figure 11:
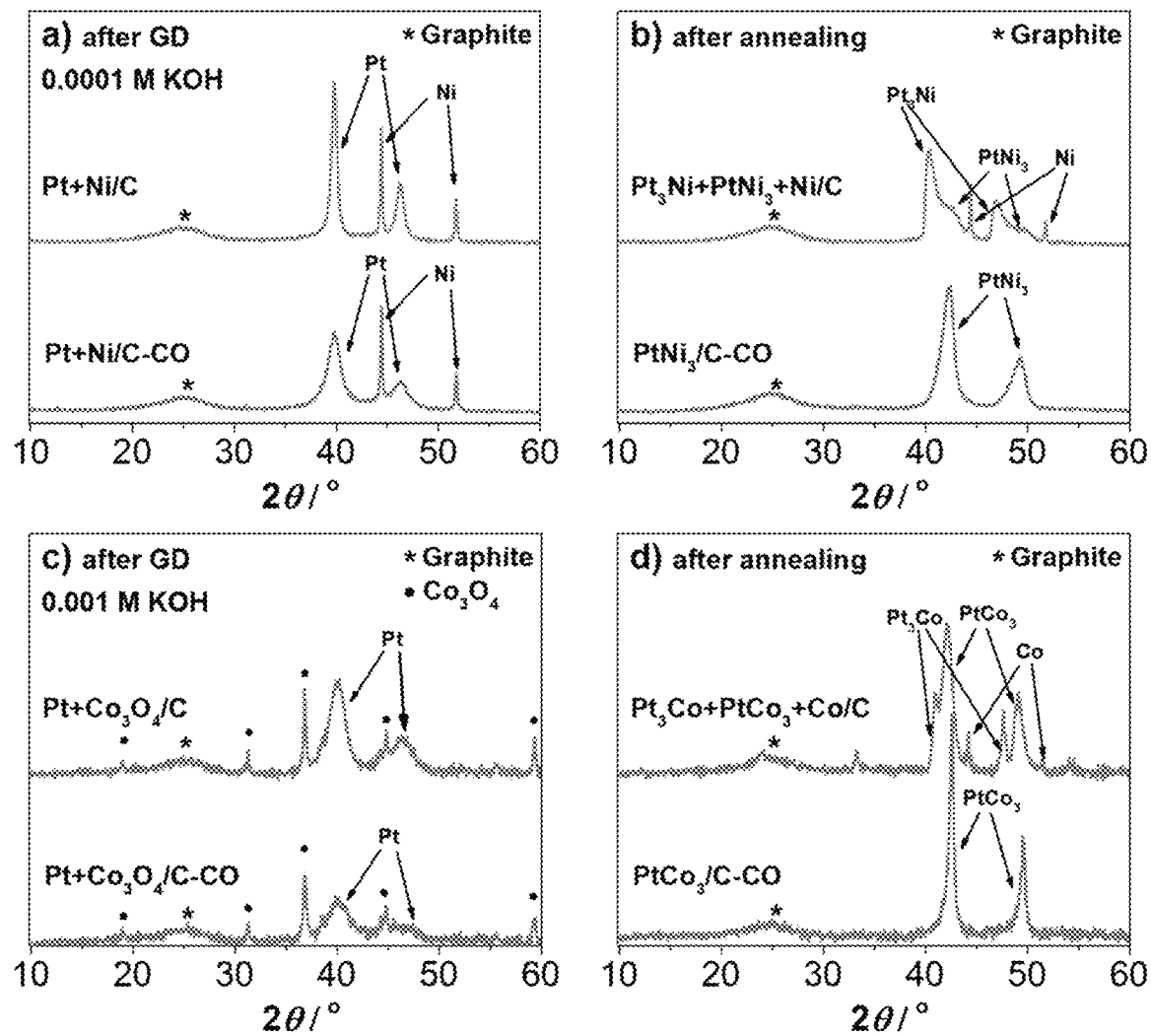
FIG. 11: XRD spectra of: (a) Pt+Ni/C (without CO gas, Example 13) and Pt+Ni/C—CO (with CO gas, Example 12) as-synthesized using double passivation GD method, (b) Pt$_3$Ni+PtNi$_3$+Ni/C (Ex. 13) and PtNi$_3$/C—CO (Ex. 12) after thermal annealing; (c) Pt+Co$_3$O$_4$/C (without CO gas, Example 15) and Pt+Co$_3$O$_4$/C—CO (with CO gas, Example 14) as-synthesized using double passivation GD method, and (d) Pt$_3$Co+PtCo$_3$+Co/C (Ex. 15) and PtCo$_3$/C—CO (Ex. 14) after thermal annealing.

FIG. 11a) and b) shows XRD pattern of the double passivation GD synthesis method using Ni/C precursor in a Pt—Ni system (Examples 12 and 13). Similar to the above explained Pt—Cu system, GD reaction took place regardless of the presence or absence of CO at the time of Pt-salt precursor addition, and there was a profound difference in the obtained Pt+Ni/C composite. As seen in FIG. 11a) the most intense peaks of the Pt phase (39.8° (111) and 46.2° (200) 2θ) are broadened with GD in the presence of CO, thus indicating smaller nanocrystallites. Like in the case of Pt—Cu system, there was no noticeable difference in the most intense peaks of the less noble metal (Ni) phase (44.3° (111) and 51.7° (200) 2θ). Further, after thermal annealing (FIG. 11b) only the PtNi$_3$ phase (42.4° (111) and 49.3° (200) 2θ) is present in the sample with CO, while the sample without CO apart from PtNi$_3$ crystal phase (42.4° (111) and 49.3° (200) 2θ) still also shows presence of Pt$_3$Ni (40.4° (111) and 51.7° (200) 2θ) and Ni (44.3° (111) and 46.8° (200) 2θ) crystal phases. The inhomogeneity of crystal phases in the case of sample as synthesized without presence of CO during the GD synthesis step is most likely a consequence of worse dispersion of Pt nanoparticles due to absence of the capping CO gas.

FIG. 11c) and d) shows XRD pattern of the double passivation GD synthesis method using Co/C precursor in a Pt—Co system (Examples 14 and 15). Similar to the above explained Pt—Cu system, GD reaction took place regardless of the presence or absence of CO at the time of Pt-salt precursor addition, and there was a profound difference in the obtained Pt+Co$_3$O$_4$/C composite. As seen in FIG. 11c) the peaks of the Pt phase (40.0° (111) and 46.5° (200) 2θ) are broadened with GD in the presence of CO, thus indicating smaller nanocrystallites. Like in the case of Pt—Cu system, there was no noticeable difference in the most intense peaks of the less noble metal (Co$_3$O$_4$) phase (19° (111), 31.3° (220), 36.8° (311), 44.8° (400) and 55.6° (422) 2θ). Further, after thermal annealing (FIG. 11d) only PtCo$_3$ crystal phase (42.6° (111) and 49.6° (200) 2θ) is present in the sample with CO, while the sample without CO showed both Pt$_3$Co (24.1 (100), 33.3 (110), 41.0° (111) and 49.6° (200) 2θ) and PtCo$_3$ (42.2° (111) and 49.1° (200) 2θ) crystal phases together with some leftover Co (44.2° (111) and 51.5° (200) 2θ) crystal phase. The inhomogeneity of crystal phases in the case of sample as synthesized without presence of CO during the GD synthesis step is most likely a consequence of worse dispersion of Pt nanoparticles due to absence of the capping CO gas.

It has been shown that the double passivation GD method, according to the present invention, provides a high flexibility in the design of the final product. The method enables variation in noble metal:M chemical composition, total metal loading of M on the carbon support, as well as variation of the carbon support itself. Further it has been shown that the present double passivation GD method provides well dispersed nanoparticles on the carbon support, giving high mass activities when used as electrocatalyst materials. Especially, it has been shown that a carbon supported platinum-alloy nanoparticle catalyst, produced according to the present invention, have very high SA (specific activities) and MA (mass activities) for the ORR (oxygen reduction reaction) due to the small particle size and alloying of platinum with M.

Example 16

CuO+Cu on reduced graphene oxide composite was synthesized in two steps. In the first step, graphene oxide was produced from graphite (TIMREX KS44) using a modified Hummers method ("Improved synthesis of Graphene Oxide", Marcanto, D. C. et al, ACS Nano 2010, 4, 8, 4806-4814). In the second step, a suspension of as-synthetized graphene oxide, copper(II) acetate monohydrate (Merck) and Milli-Q water was pumped through a pulse-combustion/thermoacoustic reactor where copper(II) acetate monohydrate as well as graphene oxide were thermally reduced in an inert acetylene atmosphere. Black composite of CuO+Cu on reduced graphene oxide was collected. For the purpose of double passivation method, 200 mg of the CuO+Cu on reduced graphene oxide composite with 38 wt % Cu was suspended in 20 mL of ultrapure water in a two neck round-bottom flask. The suspension was placed on an ultrasound bath (Ultrasound bath Iskra Sonis 4) for 3 minutes (degassing). Afterwards, the suspension was purged with CO for 15 minutes while stirring with a magnetic stirrer at 900 rpm to achieve saturation. After 15 minutes of bubbling with CO, 1.5 mL (per 100 milligram of CuO+Cu on reduced graphene oxide) of 0.1 M K$_2$PtCl$_4$ (Apollo scientific) was added with a syringe pump (WPI sp100i, flow 160 mL/h) continuously while purging the reaction mixture with CO. Everything else same as Example 1. After thermal annealing, PtCu+PtCu$_3$ on reduced graphene oxide electrocatalyst was collected at the end.

Figure 12:
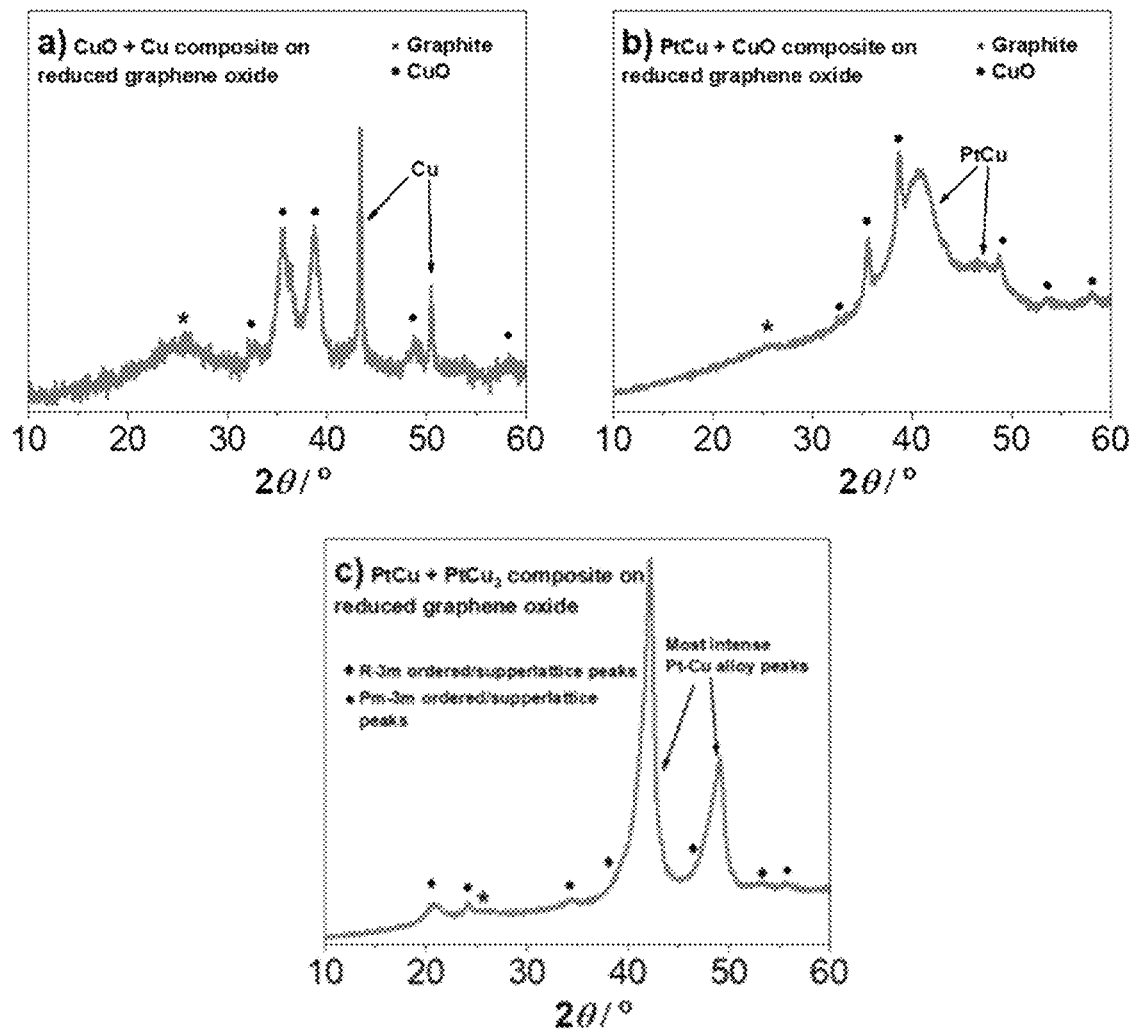
FIG. 12: XRD spectra of: (a) CuO+Cu on reduced graphene oxide precursor partially ex-situ passivated, (Example 16); (b) PtCu+CuO on reduced graphene oxide as-synthesized using double passivation GD method (Example 16); (c) PtCu+PtCu$_3$ on reduced graphene oxide after thermal annealing (Example 16).

FIG. 12a) shows XRD pattern of the CuO+Cu composite on reduced graphene oxide prepared with a thermoacoustic reactor (Example 16). Similar to the above explained Pt—Cu systems on carbon blacks, GD reaction took place via the same double passivation mechanism. FIG. 12b) shows XRD pattern of PtCu+CuO composite (as-synthesized) on the reduced graphene oxide after the synthesis using the double passivation GD (Example 16). As seen in FIG. 12b), similarly to the synthesis on carbon blacks, broad PtCu phase peaks (41.2° (111) and 47.9° (200) 2θ) are present in addition to the sharper CuO phase peaks (35.7° (−111) and 38.9° (111) 2θ). After the subsequent thermal annealing due to the ratio between Pt and Cu, both Pm3m PtCu$_3$ phase (24.1° (100), 34.3° (110), 42.4° (111) and 49.3° (200) 2θ) as well as R-3m phase (20.4° (021), 39.2° (205), 41° (006) and 47.9° (404) 2θ) are visible. Broadness of the main peaks of the XRD pattern indicate small crystallite size (Example 16).

It has been shown that the double passivation GD method, according to the present invention, provides a high flexibility in selection of support material in the use of reduced graphene oxide-based composites. Furthermore, in accordance to Example 16, the present invention also shows the possibility of using partly ex-situ passivated M/S precursors.

Example 17

To obtain metallic Cu on TiO$_x$N$_y$ substrate, the following procedure was used. In the first step, TiO$_x$N$_y$ was prepared by thermal annealing of TiO$_2$ (Degussa P25) in NH$_3$ flow (50 cm$^3$ min') at 730° C. for 12 h (both heating and cooling rate was 5° C. min$^{-1}$). In the second step, 180 mg of CuBr$_2$ was dissolved in 0.4 mL of Milli-Q water. Then 200 mg of TiO$_x$N$_y$ substrate obtained from the first step was added to the CuBr$_2$ solution. The mixture was then dried at 50° C. for 30 minutes. Dried CuBr$_2$ impregnated TiO$_x$N$_y$ powder was then thermally annealed once again in the flow of NH$_3$ (50 cm$^3$ min$^{-1}$) at 730° C. (5 hours, heating rate 2° C. min$^{-1}$, cooling rate 3° C. min$^{-1}$). In the last step, double passivation with GD was used to deposit Pt on TiO$_x$N$_y$ substrate. For the double passivation GD step, 75 mg of the Cu on TiO$_x$N$_y$ (~20 wt % Cu) was suspended in 20 mL of ultrapure water in a two neck round-bottom flask. The suspension was placed on an ultrasound bath (Ultrasound bath Iskra Sonis 4) for 3 minutes (degassing). Afterwards, the suspension was purged with CO gas for 15 minutes while stirring with a magnetic stirrer at 900 rpm to achieve saturation. After 15 minutes of bubbling with CO gas, 0.688 mL of 0.1 M $K_2PtCl_4$ (Apollo scientific) was added with a syringe pump (WPI sp100i, flow 160 mL/h) continuously while purging the reaction mixture with CO gas. After entire Pt precursor was added to the reaction mixture, the suspension was filtered and redispersed in fresh ultrapure water. After 15 minutes of mixing, the suspension was once again filtered and the process was repeated in total 3 times. After the last filtration, the obtained PtCu+CuO/TiO$_x$N$_y$ composite was left to dry at 50° C. overnight.

Figure 13:
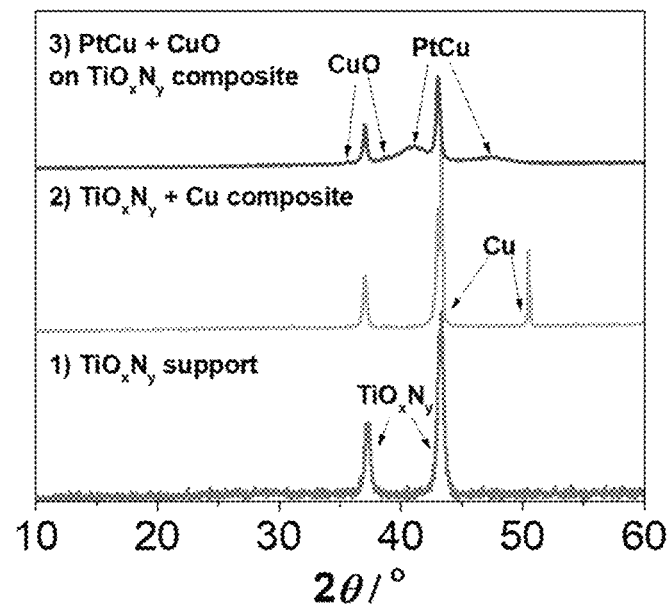
FIG. 13: XRD spectra of: 1) TiO$_x$N$_y$ support particles (Example 17); 2) TiO$_x$N$_y$ support particle with Cu metal particles deposited thereon (Example 17); 3) PtCu+CuO on TiO$_x$N$_y$ support particle as-synthesized using double passivation GD method (Example 17).

FIG. 13 shows XRD patterns of 1) proprietary TiO$_x$N$_y$ support (Example 17), 2) Cu+TiO$_x$N$_y$ composite (Example 17) before synthesis using double passivation GD method as well as 3) PtCu+CuO/TiO$_x$N$_y$ composite (Example 17) after synthesis using double passivation GD method. Similar to the above explained Pt—Cu systems on carbon blacks, GD reaction took place via the same double passivation mechanism. As seen in FIG. 13, similarly to the synthesis on carbon blacks, after synthesis using double passivation GD method. Pure Cu Fm-3m phase (43.3° (111) and 50.4° (200) 2θ) disappears and broad PtCu phase peaks (41.2° (111) and 47.9° (200) 2θ) CuO phase peaks (35.7° (−111) and 38.9° (111) 2θ) appear. TiO$_x$N$_y$ crystal phase (37° (111) and 43° (200) 2θ) remains intact throughout the whole synthesis (Example 17).

It has been shown that the double passivation GD method, according to the present invention, provides a high flexibility in selection of support material in the use of conductive ceramics (TiO$_x$N$_y$).

Example 18

Cu+Cu$_2$O+CuO composite on carbon black was synthesized in a single step. A suspension of carbon black with a BET surface area of 800 m$^2$/g, copper(II) acetate monohydrate (Merck) and Milli-Q water was pumped through a pulse-combustion/thermoacoustic reactor where copper(II) acetate monohydrate was thermally reduced on the carbon black in an inert acetylene atmosphere. Black composite of Cu+Cu$_2$O+CuO on carbon black was collected. 100 mg of the Cu+Cu$_2$O+CuO on carbon black with 41 wt % Cu was suspended in 30 mL of ultrapure water in a two neck round-bottom flask. The suspension was placed on an ultrasound bath (Ultrasound bath Iskra Sonis 4) for 3 minutes (degassing). Afterwards, the suspension was purged with H$_2$ gas for 15 minutes while stirring with a magnetic stirrer at 900 rpm to achieve saturation. After 15 minutes of bubbling with H$_2$ gas, 17.5 mL of 0.01 M Na$_2$PdCl$_4$ was added with a syringe pump (WPI sp100i, flow 10 mL/h) continuously while purging the reaction mixture with H$_2$ gas. 0.01 M Na$_2$PdCl$_4$ solution was formed in-situ from water insoluble PdCl$_2$ (Sigma Aldrich) and 3 times molar excess of NaCl. After entire Pd precursor was added to the reaction mixture, the suspension was filtered and redispersed in fresh ultrapure water. After 15 minutes of mixing, the suspension was once again filtered and the process was repeated in total 3 times. After the last filtration, the obtained Pd+Cu$_2$O+CuO on carbon black composite was left to dry at 50° C. overnight.

Example 19

Cu+Cu$_2$O+CuO composite on carbon black was synthesized in a single step. A suspension of carbon black with a BET surface area of 800 m$^2$/g, copper(II) acetate monohydrate (Merck) and Milli-Q water was pumped through a pulse-combustion/thermoacoustic reactor where copper(II) acetate monohydrate was thermally reduced on the carbon black in an inert acetylene atmosphere. Black composite of Cu+Cu$_2$O+CuO on carbon black was collected. 100 mg of the Cu+Cu$_2$O+CuO on carbon black with 41 wt % Cu was suspended in 30 mL of ultrapure water in a two neck round-bottom flask. The suspension was placed on an ultrasound bath (Ultrasound bath Iskra Sonis 4) for 3 minutes (degassing). Afterwards, the suspension was purged with CO gas for 15 minutes while stirring with a magnetic stirrer at 900 rpm to achieve saturation. After 15 minutes of bubbling with CO gas, 17.5 mL of 0.01 M Na$_2$PdCl$_4$ was added with a syringe pump (WPI sp100i, flow 10 mL/h) continuously while purging the reaction mixture with CO gas. 0.01 M Na$_2$PdCl$_4$ solution was formed in-situ from water insoluble PdCl$_2$ (Sigma Aldrich) and 3 times molar excess of NaCl. After entire Pd precursor was added to the reaction mixture, the suspension was filtered and redispersed in fresh ultrapure water. After 15 minutes of mixing, the suspension was once again filtered and the process was repeated in total 3 times. After the last filtration, the obtained Pd+Cu$_2$O+CuO on carbon black composite was left to dry at 50° C. overnight.

Figure 14:
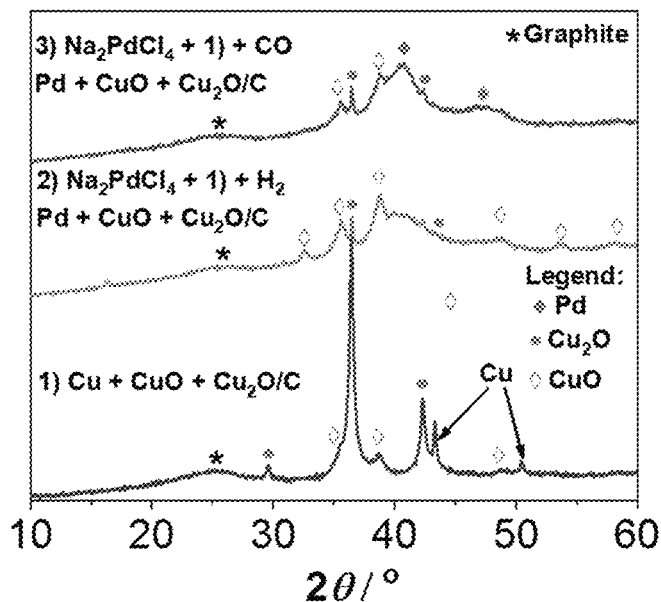
FIG. 14: XRD spectra of: 1) Cu+Cu$_2$O+CuO/C precursor, C being carbon black with a BET of 800 m$^2$/g (Example 18 and 19); 2) Pd+Cu$_2$O+CuO/C composite as-synthesized using double passivation GD method in presence of H$_2$ (Example 18) 3) Pd+Cu$_2$O+CuO/C composite as-synthesized using double passivation GD method in presence of CO (Example 19).

FIG. 14 shows XRD patterns of 1) Cu+Cu$_2$O+CuO composite on carbon black (Example 18 and 19), 2) Pd+Cu$_2$O+CuO composite on carbon black (Example 18) as-synthesized in presence of H$_2$ gas using double passivation GD method and 3) Pd+Cu$_2$O+CuO composite on carbon black (Example 19) as-synthesized in presence of CO gas using double passivation GD method. Similar to the above explained systems on carbon blacks with Pt as the noble metal, GD reaction took place via the same double passivation mechanism. FIG. 14 in the case of 2 and 3 thus shows comparison of obtained XRD patterns of Pd+Cu$_2$O+CuO composite on carbon black support as-synthesized using either H$_2$ gas (Example 18) or CO gas (Example 19). Similarly to the synthesis with Pt as the noble metal, broad noble metal (Pd) phase peaks (40.2° (111) and 46.8° (200) 2θ) are present in addition to the sharper CuO phase peaks (35.7° (−111) and 38.9° (111) 2θ) as well as Cu$_2$O phase peaks (36.4° (111) and 42.3° (200) 2θ). It has been shown that the double passivation GD method, according to the present invention, provides a high flexibility in the use of other noble metals and adsorption gases. Furthermore, analogously to Example 16, Examples 18 and 19 also show the present invention provides the possibility of using partly ex-situ passivated M/S precursors.

Having described different embodiments of the invention it will be apparent to those skilled in the art that other embodiments incorporating the concepts may be used. These and other examples of the invention illustrated above and in the accompanying drawings are intended by way of example only and the actual scope of the invention is to be determined from the following claims.

The invention claimed is:
1. A method for forming supported noble metal nanoparticles and/or noble metal-M alloy nanoparticles composite, M being a less noble metal galvanically displaced to deposit the noble metal, the method comprising the following steps:
(a) providing a M/S precursor material of metal particles, M, on electrical conductive support particles, S, where M is one or more metal having lower standard electrode potential than the noble metal, wherein the support particles have an electrical conductivity larger than any formed passivating M-oxide layer of the metal M deposited thereon;

(b) suspending the M/S precursor material in a liquid medium, the liquid medium having a pH at which an in-situ passivating oxide is thermodynamically formed at least on the surface of the metal M particles being exposed to the liquid medium, forming a passivated $MO_y/S$ suspension, y being >0 up to a stoichiometric M-oxide value;

(c) providing an adsorptive gas to the $MO_y/S$ suspension in the same liquid medium as step (b), the adsorptive gas being selectively adsorbable on the noble metal to be deposited;

(d) adding a noble metal precursor to the $MO_y/S$ suspension in the same liquid medium as step (c), thereby depositing as a reaction product crystalline noble metal nanoparticles and/or crystalline noble metal-M alloy nanoparticles on the support particles by a galvanic displacement reaction; and (e) separating and washing the as-synthesized reaction product.

2. The method claim 1, wherein the metal M of the M/S precursor in step (a) is at least partially oxidized forming an ex-situ passivated M+MO/S precursor.

3. The method according to claim 1, where the liquid medium is (i) water, (ii) an alcohol having 1-7 carbon atoms of the formula $CH_4O$ to $C_7H_{16}O$, or a mixture thereof, or (iii) an aqueous solution of said alcohol(s).

4. The method according to claim 1, wherein the passivated $MO_y/S$ suspension is saturated with the adsorptive gas before addition of the noble metal precursor.

5. The method according to claim 4, wherein addition of the adsorptive gas is continued during addition of the noble metal precursor.

6. The method according to claim 1, wherein the noble metal precursor is a salt or the corresponding acid of the salt, soluble in the liquid medium.

7. The method according to claim 1, wherein the noble metal is Pt, Ir, Rh, Pd or Au.

8. The method according to claim 1, wherein the adsorptive gas is selected from the group consisting of carbon monoxide (CO), hydrogen ($H_2$), methanethiol (MeHS) or hydrogen sulphide ($H_2S$).

9. The method according to claim 1, wherein (i) the noble metal is Pt or Pd and the adsorptive gas is CO, or (ii) the noble metal is Pd and the adsorptive gas is $H_2$.

10. The method according to claim 1, where the less noble metal M is selected from the group consisting of Cu, Ni, Co, Fe, Ag, Cr, Ti, Pb, Sn, Mo, W, Zn, Y, Gd, Pd, or a mixture thereof.

11. The method according claim 1, wherein the support material is an electrical conductive material having an electrical conductivity greater than the conductivity of the formed passivating M-oxide, wherein the support material is selected from the group consisting of carbon material, ceramic material or a composite material.

* * * * *